United States Patent
Greene et al.

(10) Patent No.: US 11,190,617 B2
(45) Date of Patent: *Nov. 30, 2021

(54) DATA TRANSMISSION TO A NETWORKED RESOURCE BASED ON CONTEXTUAL INFORMATION

(71) Applicant: BANK OF AMERICA CORPORATION, Charlotte, NC (US)

(72) Inventors: Tracy Beth Greene, Mooresville, NC (US); Frederika Zipporah Morris Angus, Charlotte, NC (US); Emily Paige Bosin, Charlotte, NC (US); Kathleen Miranda Brand, Charlotte, NC (US); William Bradley Burks, Charlotte, NC (US); Deepak Joseph, Charlotte, NC (US); Karla Ramirez, Charlotte, NC (US); Laura Elizabeth Randall, Davidson, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 249 days.

This patent is subject to a terminal disclaimer.

(21) Appl. No.: 16/713,448

(22) Filed: Dec. 13, 2019

(65) Prior Publication Data

US 2020/0120186 A1  Apr. 16, 2020

Related U.S. Application Data

(63) Continuation of application No. 15/630,289, filed on Jun. 22, 2017, now Pat. No. 10,511,692.

(51) Int. Cl.
*H04L 29/08* (2006.01)
*H04L 12/24* (2006.01)
(Continued)

(52) U.S. Cl.
CPC ........ *H04L 67/327* (2013.01); *H04L 41/0806* (2013.01); *H04L 41/0896* (2013.01);
(Continued)

(58) Field of Classification Search
CPC .................................................... H04L 67/327
See application file for complete search history.

(56) References Cited

U.S. PATENT DOCUMENTS

| 3,119,103 A | 1/1964 | Baines |
| 3,254,000 A | 5/1966 | Chibret |

(Continued)

FOREIGN PATENT DOCUMENTS

| EP | 1132876 A2 | 9/2001 |
| WO | 2012058099 A1 | 5/2012 |
| WO | 2013095486 A1 | 6/2013 |

OTHER PUBLICATIONS

Werden, Kristina. "How to Combine Visa Gift Cards." eHow.com. 1 page.http://www.ehow.com/how 6216118 combine-uisa-gift-cards.html. Retrieved Jan. 8, 2013.

(Continued)

*Primary Examiner* — Douglas B Blair
(74) *Attorney, Agent, or Firm* — Michael A. Springs; Moore & Van Allen PLLC; Nicholas C. Russell

(57) ABSTRACT

Embodiments of the present invention provide a system for transmitting data to networked resources based on extracted contextual information from said networked resources. The system gathers contextual data from devices on the network, extracts contextual information from the contextual data, and determines supplemental resources to provide to the networked devices based on the contextual information. The system may further provide an augmented reality environment to a networked device that integrates identifies objects (Continued)

in an image and integrates notifications of supplemental resources in the augmented reality environment.

19 Claims, 4 Drawing Sheets

(51) Int. Cl.
    *H04L 29/06*     (2006.01)
    *G06F 16/957*     (2019.01)

(52) U.S. Cl.
    CPC .............. *H04L 41/50* (2013.01); *H04L 67/32* (2013.01); *H04L 69/22* (2013.01); *G06F 16/9574* (2019.01); *H04L 41/08* (2013.01); *H04L 67/2847* (2013.01); *H04L 67/306* (2013.01); *H04L 69/18* (2013.01)

(56) References Cited

U.S. PATENT DOCUMENTS

| | | |
|---|---|---|
| 3,256,670 A | 6/1966 | Tersigni |
| 3,307,412 A | 3/1967 | Granqvist |
| 3,330,546 A | 7/1967 | Bryan |
| 3,352,730 A | 11/1967 | Murch, Jr. |
| 3,516,056 A | 6/1970 | Matthews |
| 3,658,393 A | 4/1972 | Luthi |
| 3,718,328 A | 2/1973 | Comstock |
| 4,766,293 A | 8/1988 | Boston |
| 5,041,851 A | 8/1991 | Nelson |
| 5,176,224 A | 1/1993 | Spector |
| 5,192,854 A | 3/1993 | Counts |
| 5,201,010 A | 4/1993 | Deaton et al. |
| 5,202,826 A | 4/1993 | McCarthy |
| 5,227,874 A | 7/1993 | Von Kohorn |
| 5,239,165 A | 8/1993 | Novak |
| 5,245,533 A | 9/1993 | Marshall |
| 5,250,789 A | 10/1993 | Johnsen |
| 5,256,863 A | 10/1993 | Ferguson et al. |
| 5,265,008 A | 11/1993 | Benton et al. |
| 5,283,734 A | 2/1994 | Von Kohorn |
| 5,285,278 A | 2/1994 | Holman |
| 5,287,181 A | 2/1994 | Holman |
| 5,305,196 A | 4/1994 | Deaton et al. |
| 5,353,218 A | 10/1994 | De Lapa et al. |
| 5,368,129 A | 11/1994 | Von Kohorn |
| 5,373,440 A | 12/1994 | Cohen et al. |
| 5,388,165 A | 2/1995 | Deaton et al. |
| 5,398,326 A | 3/1995 | Lee |
| 5,398,932 A | 3/1995 | Eberhardt et al. |
| 5,417,424 A | 5/1995 | Snowden et al. |
| 5,420,606 A | 5/1995 | Begum et al. |
| 5,430,644 A | 7/1995 | Deaton et al. |
| 5,438,186 A | 8/1995 | Nair et al. |
| 5,448,471 A | 9/1995 | Deaton et al. |
| 5,470,079 A | 11/1995 | LeStrange et al. |
| 5,471,669 A | 11/1995 | Lidman |
| 5,484,998 A | 1/1996 | Bejnar et al. |
| 5,491,326 A | 2/1996 | Marceau et al. |
| 5,492,370 A | 2/1996 | Chatwin et al. |
| 5,497,314 A | 3/1996 | Novak |
| 5,501,491 A | 3/1996 | Thompson |
| 5,508,731 A | 4/1996 | Von Kohorn |
| 5,517,015 A | 5/1996 | Curry et al. |
| 5,523,794 A | 6/1996 | Mankovitz et al. |
| 5,537,314 A | 7/1996 | Kanter |
| 5,539,450 A | 7/1996 | Handelman |
| 5,557,516 A | 9/1996 | Hogan |
| 5,570,465 A | 10/1996 | Tsakanikas |
| 5,588,649 A | 12/1996 | Blumberg et al. |
| 5,592,212 A | 1/1997 | Handelman |
| 5,592,376 A | 1/1997 | Hodroff |
| 5,592,560 A | 1/1997 | Deaton et al. |
| 5,603,078 A | 2/1997 | Henderson et al. |
| 5,612,527 A | 3/1997 | Ovadia |
| 5,612,868 A | 3/1997 | Off et al. |
| 5,613,012 A | 3/1997 | Hoffman et al. |
| 5,619,066 A | 4/1997 | Curry et al. |
| 5,620,079 A | 4/1997 | Molbak |
| 5,621,812 A | 4/1997 | Deaton et al. |
| 5,638,457 A | 6/1997 | Deaton et al. |
| 5,644,723 A | 7/1997 | Deaton et al. |
| 5,649,114 A | 7/1997 | Deaton et al. |
| 5,650,604 A | 7/1997 | Marcous et al. |
| 5,651,168 A | 7/1997 | Tung et al. |
| 5,659,469 A | 8/1997 | Deaton et al. |
| 5,659,740 A | 8/1997 | Ezaki et al. |
| 5,675,662 A | 10/1997 | Deaton et al. |
| 5,687,322 A | 11/1997 | Deaton et al. |
| 5,689,100 A | 11/1997 | Carrithers et al. |
| 5,703,795 A | 12/1997 | Mankovitz |
| 5,708,782 A | 1/1998 | Larson et al. |
| 5,710,886 A | 1/1998 | Christensen et al. |
| 5,715,448 A | 2/1998 | Suzuki et al. |
| 5,731,980 A | 3/1998 | Dolan et al. |
| 5,732,398 A | 3/1998 | Tagawa |
| 5,734,838 A | 3/1998 | Robinson et al. |
| 5,736,721 A | 4/1998 | Swartz |
| 5,739,512 A | 4/1998 | Tognazzini |
| 5,745,555 A | 4/1998 | Mark |
| 5,759,101 A | 6/1998 | Von Kohorn |
| 5,767,896 A | 6/1998 | Nemirofsky |
| 5,789,732 A | 8/1998 | McMahon et al. |
| 5,791,991 A | 8/1998 | Small |
| 5,799,767 A | 9/1998 | Molbak |
| 5,805,719 A | 9/1998 | Pare, Jr. et al. |
| 5,806,044 A | 9/1998 | Powell |
| 5,819,239 A | 10/1998 | Berson et al. |
| 5,821,512 A | 10/1998 | O'Hagan et al. |
| 5,822,735 A | 10/1998 | De Lapa et al. |
| 5,822,744 A | 10/1998 | Kesel |
| 5,832,457 A | 11/1998 | O'Brien et al. |
| 5,832,458 A | 11/1998 | Jones |
| 5,838,812 A | 11/1998 | Pare, Jr. et al. |
| 5,841,870 A | 11/1998 | Fieres et al. |
| 5,845,259 A | 12/1998 | West et al. |
| 5,845,265 A | 12/1998 | Woolston |
| 5,852,813 A | 12/1998 | Guenther et al. |
| 5,855,007 A | 12/1998 | Jovicic et al. |
| 5,855,369 A | 1/1999 | Lieberman |
| 5,855,514 A | 1/1999 | Kamille |
| 5,857,175 A | 1/1999 | Day et al. |
| 5,859,414 A | 1/1999 | Grimes et al. |
| 5,865,470 A | 2/1999 | Thompson |
| 5,870,723 A | 2/1999 | Pare, Jr. et al. |
| 5,873,069 A | 2/1999 | Reuhl et al. |
| 5,880,449 A | 3/1999 | Teicher et al. |
| 5,884,278 A | 3/1999 | Powell |
| 5,887,271 A | 3/1999 | Powell |
| 5,892,827 A | 4/1999 | Beach et al. |
| 5,895,902 A | 4/1999 | Ziarno |
| 5,905,246 A | 5/1999 | Fajkowski |
| 5,907,350 A | 5/1999 | Nemirofsky |
| 5,916,024 A | 6/1999 | Von Kohorn |
| 5,917,168 A | 6/1999 | Nakamura et al. |
| 5,918,213 A | 6/1999 | Bernard et al. |
| 5,923,016 A | 7/1999 | Fredregill et al. |
| 5,924,080 A | 7/1999 | Johnson |
| 5,926,795 A | 7/1999 | Williams |
| 5,926,796 A | 7/1999 | Walker et al. |
| 5,931,467 A | 8/1999 | Kamille |
| 5,943,424 A | 8/1999 | Berger et al. |
| 5,948,040 A | 9/1999 | Delorme et al. |
| 5,950,173 A | 9/1999 | Perkowski |
| 5,953,047 A | 9/1999 | Nemirofsky |
| 5,953,705 A | 9/1999 | Oneda |
| 5,956,695 A | 9/1999 | Carrithers et al. |
| 5,967,844 A | 10/1999 | Doutrich et al. |
| 5,970,469 A | 10/1999 | Scroggie et al. |
| 5,970,470 A | 10/1999 | Walker et al. |
| 5,973,102 A | 10/1999 | McCloskey et al. |
| 5,974,396 A | 10/1999 | Anderson et al. |
| 5,978,013 A | 11/1999 | Jones et al. |
| 5,979,757 A | 11/1999 | Tracy et al. |

(56) References Cited

U.S. PATENT DOCUMENTS

| | | |
|---|---|---|
| 5,988,346 A | 11/1999 | Tedesco et al. |
| 5,992,570 A | 11/1999 | Walter et al. |
| 5,992,888 A | 11/1999 | North et al. |
| 6,000,608 A | 12/1999 | Dorf |
| 6,009,411 A | 12/1999 | Kepecs |
| 6,012,038 A | 1/2000 | Powell |
| 6,012,039 A | 1/2000 | Hoffman et al. |
| 6,014,634 A | 1/2000 | Scroggie et al. |
| 6,016,255 A | 1/2000 | Bolan et al. |
| 6,021,362 A | 2/2000 | Maggard et al. |
| 6,023,688 A | 2/2000 | Ramachandran et al. |
| 6,024,288 A | 2/2000 | Gottlich et al. |
| 6,026,387 A | 2/2000 | Kesel |
| 6,028,920 A | 2/2000 | Carson |
| 6,032,127 A | 2/2000 | Schkolnick et al. |
| 6,035,280 A | 3/2000 | Christensen |
| 6,038,549 A | 3/2000 | Davis et al. |
| 6,039,244 A | 3/2000 | Finsterwald |
| 6,048,271 A | 4/2000 | Barcelou |
| 6,055,513 A | 4/2000 | Katz et al. |
| 6,076,068 A | 6/2000 | Delapa et al. |
| 6,105,013 A | 8/2000 | Curry et al. |
| 6,110,041 A | 8/2000 | Walker et al. |
| 6,116,402 A | 9/2000 | Beach et al. |
| 6,116,505 A | 9/2000 | Withrow |
| 6,119,103 A | 9/2000 | Basch et al. |
| 6,125,349 A | 9/2000 | Maher |
| 6,129,346 A | 10/2000 | Zorn |
| 6,138,105 A | 10/2000 | Walker et al. |
| 6,138,911 A | 10/2000 | Fredregill et al. |
| 6,161,059 A | 12/2000 | Tedesco et al. |
| 6,185,545 B1 | 2/2001 | Resnick et al. |
| 6,189,787 B1 | 2/2001 | Dorf |
| 6,199,753 B1 | 3/2001 | Tracy et al. |
| 6,230,143 B1 | 5/2001 | Simons et al. |
| 6,233,564 B1 | 5/2001 | Schulze |
| 6,237,145 B1 | 5/2001 | Narasimhan et al. |
| 6,251,017 B1 | 6/2001 | Leason et al. |
| 6,254,000 B1 | 7/2001 | Degen et al. |
| 6,256,670 B1 | 7/2001 | Davies |
| 6,266,647 B1 | 7/2001 | Fernandez |
| 6,276,724 B1 | 8/2001 | Zorn |
| 6,292,785 B1 | 9/2001 | McEvoy et al. |
| 6,292,786 B1 | 9/2001 | Deaton et al. |
| 6,306,035 B1 | 10/2001 | Kelly et al. |
| 6,308,893 B1 | 10/2001 | Waxelbaum et al. |
| 6,311,896 B1 | 11/2001 | Mulla et al. |
| 6,314,519 B1 | 11/2001 | Davis et al. |
| 6,321,208 B1 | 11/2001 | Barnett et al. |
| 6,327,594 B1 | 12/2001 | Van Huben et al. |
| 6,330,543 B1 | 12/2001 | Kepecs |
| 6,330,546 B1 | 12/2001 | Gopinathan et al. |
| 6,332,128 B1 | 12/2001 | Nicholson |
| 6,334,108 B1 | 12/2001 | Deaton et al. |
| 6,336,099 B1 | 1/2002 | Barnett et al. |
| 6,351,735 B1 | 2/2002 | Deaton et al. |
| 6,356,877 B1 | 3/2002 | Schulden et al. |
| 6,363,351 B1 | 3/2002 | Moro |
| 6,366,682 B1 | 4/2002 | Hoffman et al. |
| 6,377,935 B1 | 4/2002 | Deaton et al. |
| 6,386,323 B1 | 5/2002 | Ramachandran et al. |
| 6,394,341 B1 | 5/2002 | Makipaa et al. |
| 6,394,907 B1 | 5/2002 | Rowe |
| 6,397,198 B1 | 5/2002 | Hoffman et al. |
| 6,402,030 B1 | 6/2002 | Summers et al. |
| 6,408,286 B1 | 6/2002 | Heiden |
| 6,422,462 B1 | 7/2002 | Cohen |
| 6,424,949 B1 | 7/2002 | Deaton et al. |
| 6,456,980 B1 | 9/2002 | Powell |
| 6,466,921 B1 | 10/2002 | Cordery et al. |
| 6,467,684 B2 | 10/2002 | Fite et al. |
| 6,467,686 B1 | 10/2002 | Guthrie et al. |
| 6,487,540 B1 | 11/2002 | Smith et al. |
| 6,493,110 B1 | 12/2002 | Roberts |
| 6,493,724 B1 | 12/2002 | Cusack et al. |
| 6,496,804 B2 | 12/2002 | McEvoy et al. |
| 6,497,360 B1 | 12/2002 | Schulze |
| 6,508,398 B1 | 1/2003 | Estes |
| 6,516,056 B1 | 2/2003 | Justice et al. |
| 6,651,168 B1 | 11/2003 | Kao et al. |
| 6,658,393 B1 | 12/2003 | Basch et al. |
| 6,718,328 B1 | 4/2004 | Norris |
| 6,722,473 B1 | 4/2004 | Ramachandran et al. |
| 6,748,365 B1 | 6/2004 | Quinlan et al. |
| 6,748,367 B1 | 6/2004 | Lee |
| 6,749,240 B1 | 6/2004 | Burr et al. |
| 6,758,393 B1 | 7/2004 | Luciano et al. |
| 6,766,301 B1 | 7/2004 | Daniel et al. |
| 6,769,010 B1 | 7/2004 | Knapp et al. |
| 6,778,967 B1 | 8/2004 | Nicholson |
| 6,779,772 B2 | 8/2004 | De Leon |
| 6,795,707 B2 | 9/2004 | Martin et al. |
| 6,810,385 B1 | 10/2004 | Brady et al. |
| 6,829,596 B1 | 12/2004 | Frazee |
| 6,837,436 B2 | 1/2005 | Swartz et al. |
| 6,850,901 B1 | 2/2005 | Hunter et al. |
| 6,852,031 B1 | 2/2005 | Rowe |
| 6,862,575 B1 | 3/2005 | Anttila et al. |
| 6,865,546 B1 | 3/2005 | Song |
| 6,868,406 B1 | 3/2005 | Ogg et al. |
| 6,876,978 B1 | 4/2005 | Walker et al. |
| 6,882,442 B2 | 4/2005 | Roberts |
| 6,885,994 B1 | 4/2005 | Scroggie et al. |
| 6,886,748 B1 | 5/2005 | Moore |
| 6,892,180 B1 | 5/2005 | Pointeau et al. |
| 6,898,598 B2 | 5/2005 | Himmel et al. |
| 6,901,374 B1 | 5/2005 | Himes |
| 6,901,436 B1 | 5/2005 | Schneider |
| 6,915,271 B1 | 7/2005 | Meyer et al. |
| 6,925,441 B1 | 8/2005 | Jones, III et al. |
| 6,932,270 B1 | 8/2005 | Fajkowski |
| 6,937,995 B1 | 8/2005 | Kepecs |
| 6,954,732 B1 | 10/2005 | DeLapa et al. |
| 6,957,186 B1 | 10/2005 | Guheen et al. |
| 6,959,286 B2 | 10/2005 | Perkowski |
| 6,961,712 B1 | 11/2005 | Perkowski |
| 6,961,713 B2 | 11/2005 | Perkowski |
| 6,965,872 B1 | 11/2005 | Grdina |
| 6,969,318 B1 | 11/2005 | Packes, Jr. et al. |
| 6,970,852 B1 | 11/2005 | Sendo et al. |
| 6,975,937 B1 | 12/2005 | Kantarjiev et al. |
| 6,978,380 B1 | 12/2005 | Husain et al. |
| 6,980,670 B1 | 12/2005 | Hoffman et al. |
| 6,985,452 B2 | 1/2006 | Marshall et al. |
| 6,985,608 B2 | 1/2006 | Hoffman et al. |
| 6,993,498 B1 | 1/2006 | Deaton et al. |
| 6,999,943 B1 | 2/2006 | Johnson et al. |
| 7,003,495 B1 | 2/2006 | Burger et al. |
| 7,003,500 B1 | 2/2006 | Driessen |
| 7,006,983 B1 | 2/2006 | Packes, Jr. et al. |
| 7,010,498 B1 | 3/2006 | Berstis |
| 7,013,286 B1 | 3/2006 | Aggarwal et al. |
| 7,013,290 B2 | 3/2006 | Ananian |
| 7,016,532 B2 | 3/2006 | Boncyk et al. |
| 7,016,860 B2 | 3/2006 | Modani et al. |
| 7,016,862 B1 | 3/2006 | Vassigh et al. |
| 7,024,374 B1 | 4/2006 | Day et al. |
| 7,031,945 B1 | 4/2006 | Donner |
| 7,043,441 B1 | 5/2006 | Maher |
| 7,047,205 B2 | 5/2006 | Hale et al. |
| 7,052,393 B1 | 5/2006 | Schoen |
| 7,054,830 B1 | 5/2006 | Eggleston et al. |
| 7,054,837 B2 | 5/2006 | Hoffman et al. |
| 7,058,596 B1 | 6/2006 | Wojcik et al. |
| 7,058,806 B2 | 6/2006 | Smeets et al. |
| 7,063,263 B2 | 6/2006 | Swartz et al. |
| 7,065,559 B1 | 6/2006 | Weiss |
| 7,068,382 B1 | 6/2006 | Silverbrook et al. |
| 7,072,862 B1 | 7/2006 | Wilson |
| 7,085,818 B2 | 8/2006 | Brown et al. |
| 7,089,199 B2 | 8/2006 | Perkowski |
| 7,089,322 B1 | 8/2006 | Stallmann |
| 7,107,221 B1 | 9/2006 | Tracy et al. |
| 7,107,231 B1 | 9/2006 | Hall et al. |

(56) References Cited

U.S. PATENT DOCUMENTS

| | | | |
|---|---|---|---|
| 7,111,323 | B1 | 9/2006 | Bhatia et al. |
| 7,117,183 | B2 | 10/2006 | Blair et al. |
| 7,120,596 | B2 | 10/2006 | Hoffman et al. |
| 7,120,607 | B2 | 10/2006 | Bolle et al. |
| 7,124,101 | B1 | 10/2006 | Mikurak |
| 7,127,236 | B2 | 10/2006 | Khan et al. |
| 7,127,414 | B1 | 10/2006 | Awadallah et al. |
| 7,130,807 | B1 | 10/2006 | Mikurak |
| 7,136,835 | B1 | 11/2006 | Flitcroft et al. |
| 7,143,055 | B1 | 11/2006 | Perkowski |
| 7,150,028 | B1 | 12/2006 | Ranta |
| 7,152,040 | B1 | 12/2006 | Hawthorne et al. |
| 7,155,228 | B2 | 12/2006 | Rappaport et al. |
| 7,158,948 | B1 | 1/2007 | Rodriguez et al. |
| 7,162,454 | B1 | 1/2007 | Donner et al. |
| 7,165,041 | B1 | 1/2007 | Guheen et al. |
| 7,168,617 | B2 | 1/2007 | Walker et al. |
| 7,177,838 | B1 | 2/2007 | Ling |
| 7,178,720 | B1 | 2/2007 | Strubbe et al. |
| 7,185,809 | B2 | 3/2007 | Barton et al. |
| 7,188,138 | B1 | 3/2007 | Schneider |
| 7,203,665 | B2 | 4/2007 | Donner |
| 7,213,754 | B2 | 5/2007 | Eglen et al. |
| 7,216,109 | B1 | 5/2007 | Donner |
| 7,216,110 | B1 | 5/2007 | Ogg et al. |
| 7,231,357 | B1 | 6/2007 | Shanman et al. |
| 7,233,913 | B2 | 6/2007 | Scroggie et al. |
| 7,236,956 | B1 | 6/2007 | Ogg et al. |
| 7,240,023 | B1 | 7/2007 | Powell |
| 7,240,037 | B1 | 7/2007 | Bussell |
| 7,246,158 | B2 | 7/2007 | Kitada et al. |
| 7,248,719 | B2 | 7/2007 | Hoffman et al. |
| 7,249,096 | B1 | 7/2007 | Lasater et al. |
| 7,257,545 | B1 | 8/2007 | Hung |
| 7,263,507 | B1 | 8/2007 | Brake, Jr. et al. |
| 7,267,614 | B1 | 9/2007 | Jorasch et al. |
| 7,277,866 | B1 | 10/2007 | Or-Bach et al. |
| 7,280,975 | B1 | 10/2007 | Donner |
| 7,280,979 | B1 | 10/2007 | Katz et al. |
| 7,283,650 | B1 | 10/2007 | Sharma et al. |
| 7,283,974 | B2 | 10/2007 | Katz et al. |
| 7,292,999 | B2 | 11/2007 | Hobson et al. |
| 7,296,282 | B1 | 11/2007 | Koplar et al. |
| 7,306,141 | B1 | 12/2007 | Schwarz, Jr. |
| 7,308,254 | B1 | 12/2007 | Rissanen |
| 7,311,244 | B1 | 12/2007 | Schwarz, Jr. |
| 7,315,826 | B1 | 1/2008 | Guheen et al. |
| 7,318,041 | B2 | 1/2008 | Walker et al. |
| 7,319,987 | B1 | 1/2008 | Hoffman et al. |
| 7,328,189 | B2 | 2/2008 | Ling |
| 7,330,974 | B1 | 2/2008 | Silverbrook et al. |
| 7,334,728 | B2 | 2/2008 | Williams |
| 7,337,144 | B1 | 2/2008 | Blinn et al. |
| 7,340,439 | B2 | 3/2008 | Burger et al. |
| 7,343,350 | B2 | 3/2008 | Donner |
| 7,349,668 | B2 | 3/2008 | Ilan et al. |
| 7,357,311 | B2 | 4/2008 | Silverbrook et al. |
| 7,357,312 | B2 | 4/2008 | Gangi |
| 7,364,068 | B1 | 4/2008 | Strubbe et al. |
| 7,364,086 | B2 | 4/2008 | Mesaros |
| 7,367,500 | B2 | 5/2008 | Fajkowski |
| 7,376,580 | B1 | 5/2008 | Walker et al. |
| 7,376,591 | B2 | 5/2008 | Owens |
| 7,377,421 | B2 | 5/2008 | Rhoads |
| 7,379,891 | B1 | 5/2008 | Donner et al. |
| 7,380,709 | B2 | 6/2008 | Silverbrook et al. |
| 7,386,485 | B1 | 6/2008 | Mussman et al. |
| 7,386,517 | B1 | 6/2008 | Donner |
| 7,396,281 | B2 | 7/2008 | Mendelsohn et al. |
| 7,398,225 | B2 | 7/2008 | Voltmer et al. |
| 7,398,250 | B2 | 7/2008 | Blinn et al. |
| 7,400,932 | B2 | 7/2008 | Ackley et al. |
| 7,403,652 | B2 | 7/2008 | Boncyk et al. |
| 7,403,796 | B2 | 7/2008 | Silverbrook et al. |
| 7,406,436 | B1 | 7/2008 | Reisman |
| 7,407,092 | B2 | 8/2008 | Silverbrook et al. |
| 7,412,081 | B2 | 8/2008 | Doi |
| 7,412,409 | B2 | 8/2008 | Aliabadi et al. |
| 7,415,424 | B1 | 8/2008 | Donner |
| 7,415,443 | B2 | 8/2008 | Hobson et al. |
| 7,424,303 | B2 | 9/2008 | Al-Sarawi |
| 7,428,498 | B2 | 9/2008 | Voltmer et al. |
| 7,428,986 | B2 | 9/2008 | Silverbrook et al. |
| 7,438,215 | B2 | 10/2008 | Silverbrook et al. |
| 7,441,697 | B2 | 10/2008 | Fletcher |
| 7,441,710 | B2 | 10/2008 | Perkowski |
| 7,441,712 | B2 | 10/2008 | Silverbrook et al. |
| 7,448,538 | B2 | 11/2008 | Fletcher |
| 7,455,586 | B2 | 11/2008 | Nguyen et al. |
| 7,464,050 | B1 | 12/2008 | Deaton et al. |
| 7,469,829 | B2 | 12/2008 | Silverbrook et al. |
| 7,472,827 | B2 | 1/2009 | Fletcher |
| 7,477,780 | B2 | 1/2009 | Boncyk et al. |
| 7,487,912 | B2 | 2/2009 | Seifert et al. |
| 7,490,065 | B1 | 2/2009 | Ogg et al. |
| 7,496,524 | B2 | 2/2009 | Voltmer et al. |
| 7,496,527 | B2 | 2/2009 | Silverstein et al. |
| 7,506,168 | B2 | 3/2009 | Silverbrook et al. |
| 7,515,914 | B2 | 4/2009 | Herrod et al. |
| 7,516,886 | B2 | 4/2009 | Gangi |
| 7,526,280 | B2 | 4/2009 | Jung et al. |
| 7,529,688 | B2 | 5/2009 | Prakash |
| 7,529,713 | B1 | 5/2009 | Donner |
| 7,533,810 | B2 | 5/2009 | Walker et al. |
| 7,534,169 | B2 | 5/2009 | Amaitis et al. |
| 7,536,034 | B2 | 5/2009 | Rhoads et al. |
| 7,537,153 | B2 | 5/2009 | Hurwitz et al. |
| 7,540,408 | B2 | 6/2009 | Levine et al. |
| 7,546,257 | B2 | 6/2009 | Hoffman et al. |
| 7,548,889 | B2 | 6/2009 | Bhambri et al. |
| 7,562,028 | B1 | 7/2009 | Donner |
| 7,562,051 | B1 | 7/2009 | Donner |
| 7,564,469 | B2 | 7/2009 | Cohen |
| 7,565,008 | B2 | 7/2009 | Boncyk et al. |
| 7,565,328 | B1 | 7/2009 | Donner |
| 7,567,940 | B1 | 7/2009 | Engelberg et al. |
| 7,575,172 | B2 | 8/2009 | Silverbrook et al. |
| 7,577,575 | B1 | 8/2009 | Donner et al. |
| 7,577,619 | B1 | 8/2009 | Donner et al. |
| 7,577,620 | B1 | 8/2009 | Donner |
| 7,580,856 | B1 | 8/2009 | Pliha |
| 7,584,133 | B2 | 9/2009 | Horowitz |
| 7,584,134 | B2 | 9/2009 | Horowitz |
| 7,584,139 | B2 | 9/2009 | Goodwin et al. |
| 7,590,589 | B2 | 9/2009 | Hoffberg |
| 7,591,724 | B2 | 9/2009 | Baerlocher |
| 7,593,871 | B1 | 9/2009 | Mesaros |
| 7,593,883 | B2 | 9/2009 | Horowitz |
| 7,596,530 | B1 | 9/2009 | Glasberg |
| 7,597,250 | B2 | 10/2009 | Finn |
| 7,599,857 | B2 | 10/2009 | Bishop et al. |
| 7,606,560 | B2 | 10/2009 | Labrou et al. |
| 7,606,730 | B2 | 10/2009 | Antonucci |
| 7,606,741 | B2 | 10/2009 | King et al. |
| 7,610,040 | B2 | 10/2009 | Cantini et al. |
| 7,613,628 | B2 | 11/2009 | Ariff et al. |
| 7,617,159 | B1 | 11/2009 | Donner |
| 7,620,475 | B1 | 11/2009 | Bottazzi et al. |
| 7,621,442 | B2 | 11/2009 | Silverbrook et al. |
| 7,627,499 | B2 | 12/2009 | Hahn-Carlson |
| 7,627,505 | B2 | 12/2009 | Yoshida et al. |
| 7,637,810 | B2 | 12/2009 | Amaitis et al. |
| 7,646,503 | B2 | 1/2010 | Silverbrook et al. |
| 7,657,489 | B2 | 2/2010 | Stambaugh |
| 7,658,327 | B2 | 2/2010 | Tuchman et al. |
| 7,658,674 | B2 | 2/2010 | Walker et al. |
| 7,660,581 | B2 | 2/2010 | Ramer et al. |
| 7,663,789 | B2 | 2/2010 | Silverbrook et al. |
| 7,673,315 | B1 | 3/2010 | Wong et al. |
| 7,677,445 | B2 | 3/2010 | Silverbrook et al. |
| 7,680,324 | B2 * | 3/2010 | Boncyk .............. G06K 9/00577 382/165 |
| 7,681,800 | B2 | 3/2010 | Silverbrook et al. |
| 7,685,083 | B2 | 3/2010 | Fairweather |

(56) References Cited

U.S. PATENT DOCUMENTS

| | | |
|---|---|---|
| 7,689,302 B2 | 3/2010 | Schlottmann et al. |
| 7,689,473 B2 | 3/2010 | Borom et al. |
| 7,693,766 B2 | 4/2010 | Horowitz |
| 7,693,771 B1 | 4/2010 | Zimmerman et al. |
| 7,698,221 B2 | 4/2010 | Blinn et al. |
| 7,698,443 B2 | 4/2010 | Yaffe et al. |
| 7,702,318 B2 | 4/2010 | Ramer et al. |
| 7,702,918 B2 | 4/2010 | Tattan et al. |
| 7,706,838 B2 | 4/2010 | Atsmon et al. |
| 7,711,598 B2 | 5/2010 | Perkowski |
| 7,716,077 B1 | 5/2010 | Mikurak |
| 7,716,080 B2 | 5/2010 | Postrel |
| 7,720,718 B2 | 5/2010 | Hale et al. |
| 7,729,925 B2 | 6/2010 | Maritzen et al. |
| 7,729,945 B1 | 6/2010 | Katz et al. |
| 7,735,726 B2 | 6/2010 | Bjoraker et al. |
| 7,739,162 B1 | 6/2010 | Pettay et al. |
| 7,739,169 B2 | 6/2010 | Hammad |
| 7,742,755 B2 | 6/2010 | Silverbrook et al. |
| 7,742,967 B1 | 6/2010 | Keresman, III et al. |
| 7,742,989 B2 | 6/2010 | Schultz |
| 7,747,280 B2 | 6/2010 | Silverbrook et al. |
| 7,752,141 B1 | 7/2010 | Ogg et al. |
| 7,753,259 B1 | 7/2010 | Taylor et al. |
| 7,753,264 B2 | 7/2010 | Shafer et al. |
| 7,761,338 B1 | 7/2010 | Schneider et al. |
| 7,762,470 B2 | 7/2010 | Finn et al. |
| 7,762,885 B2 | 7/2010 | Kelly et al. |
| 7,765,124 B2 | 7/2010 | Postrel |
| 7,771,271 B2 | 8/2010 | Walker et al. |
| 7,774,231 B2 | 8/2010 | Pond et al. |
| 7,774,274 B2 | 8/2010 | Jones et al. |
| 7,775,437 B2 | 8/2010 | Cohen |
| 7,778,769 B2 | 8/2010 | Boss et al. |
| 7,778,920 B2 | 8/2010 | Zarin et al. |
| 7,780,526 B2 | 8/2010 | Nguyen et al. |
| 7,783,281 B1 | 8/2010 | Cook et al. |
| 7,783,515 B1 | 8/2010 | Kumar et al. |
| 7,783,532 B2 | 8/2010 | Hsu et al. |
| 7,783,542 B2 | 8/2010 | Horowitz |
| 7,783,543 B2 | 8/2010 | Horowitz |
| 7,783,544 B2 | 8/2010 | Horowitz |
| 7,783,566 B2 | 8/2010 | Armes et al. |
| 7,784,681 B2 | 8/2010 | Silverbrook et al. |
| 7,784,682 B2 | 8/2010 | Taylor et al. |
| 7,784,684 B2 | 8/2010 | Labrou et al. |
| 7,788,129 B2 | 8/2010 | Antonucci et al. |
| 7,788,188 B2 | 8/2010 | Kramer |
| 7,792,298 B2 | 9/2010 | Silverbrook et al. |
| 7,792,518 B2 | 9/2010 | Trioano et al. |
| 7,792,539 B2 | 9/2010 | Inselberg |
| 7,792,702 B1 | 9/2010 | Katz et al. |
| 7,792,738 B2 | 9/2010 | Channell |
| 7,796,162 B2 | 9/2010 | Ortiz |
| 7,796,640 B2 | 9/2010 | Giroux et al. |
| 7,797,005 B2 | 9/2010 | Inselberg |
| 7,797,021 B2 | 9/2010 | Silverbrook et al. |
| 7,797,192 B2 | 9/2010 | Mitchell et al. |
| 7,798,397 B2 | 9/2010 | Henry et al. |
| 7,801,629 B2 | 9/2010 | Hale et al. |
| 7,812,935 B2 | 10/2010 | Cowburn et al. |
| 7,813,955 B2 | 10/2010 | Ariff et al. |
| 7,815,114 B2 | 10/2010 | Mesaros |
| 7,818,215 B2 | 10/2010 | King et al. |
| 7,818,392 B1 | 10/2010 | Martino et al. |
| 7,818,415 B2 | 10/2010 | Jhanji |
| 7,822,635 B1 | 10/2010 | Brown et al. |
| 7,822,647 B1 | 10/2010 | Mussman et al. |
| 7,828,208 B2 | 11/2010 | Gangi |
| 7,833,101 B2 | 11/2010 | Lutnick et al. |
| 7,835,960 B2 | 11/2010 | Breck et al. |
| 7,840,485 B1 | 11/2010 | Warren et al. |
| 7,843,595 B2 | 11/2010 | Silverbrook et al. |
| 7,843,596 B2 | 11/2010 | Silverbrook et al. |
| 7,844,492 B2 | 11/2010 | Perkowski et al. |
| 7,845,555 B2 | 12/2010 | Walker et al. |
| 7,848,980 B2 | 12/2010 | Carlson |
| 7,853,241 B1 | 12/2010 | Harrison |
| 7,854,386 B2 | 12/2010 | Silverbrook et al. |
| 7,855,805 B2 | 12/2010 | Silverbrook et al. |
| 7,856,360 B2 | 12/2010 | Kramer et al. |
| 7,856,368 B2 | 12/2010 | Avallone et al. |
| 7,856,377 B2 | 12/2010 | Cohagan et al. |
| 7,856,414 B2 | 12/2010 | Zee |
| 7,860,871 B2 | 12/2010 | Ramer et al. |
| 7,865,187 B2 | 1/2011 | Ramer et al. |
| 7,865,447 B2 | 1/2011 | Rosenhaft et al. |
| 7,870,022 B2 | 1/2011 | Bous et al. |
| 7,873,547 B2 | 1/2011 | Borom et al. |
| 7,873,579 B2 | 1/2011 | Hobson et al. |
| 7,873,580 B2 | 1/2011 | Hobson et al. |
| 7,881,529 B2 | 2/2011 | Boncyk et al. |
| 7,881,965 B2 | 2/2011 | Bowles et al. |
| 7,882,032 B1 | 2/2011 | Hoffman |
| 7,890,367 B2 | 2/2011 | Senghore et al. |
| 7,895,120 B2 | 2/2011 | Walker et al. |
| 7,899,243 B2 | 3/2011 | Boncyk et al. |
| 7,899,252 B2 | 3/2011 | Boncyk et al. |
| 7,899,710 B1 | 3/2011 | Walker et al. |
| 7,903,029 B2 | 3/2011 | Dupray |
| 7,907,940 B2 | 3/2011 | Ramer et al. |
| 7,908,237 B2 | 3/2011 | Angell et al. |
| 7,970,648 B2 | 6/2011 | Gailey et al. |
| 7,970,669 B1 | 6/2011 | Santos |
| 7,992,779 B2 | 8/2011 | Phillips et al. |
| 8,012,219 B2 | 9/2011 | Mendez et al. |
| 8,015,076 B2 | 9/2011 | Owens |
| 8,032,932 B2 | 10/2011 | Speyer et al. |
| 8,065,201 B2 | 11/2011 | Perkowski |
| 8,073,460 B1 | 12/2011 | Scofield et al. |
| 8,099,360 B2 | 1/2012 | Walker et al. |
| 8,138,930 B1 | 3/2012 | Heath |
| 8,160,929 B1 | 4/2012 | Park et al. |
| 8,167,199 B1 | 5/2012 | Voutour |
| 8,171,531 B2 | 5/2012 | Buer |
| 8,180,706 B2 | 5/2012 | Bishop et al. |
| 8,209,229 B1 | 6/2012 | Weiss et al. |
| 8,249,805 B2 | 8/2012 | de Silva et al. |
| 8,260,663 B1 | 9/2012 | Ranka et al. |
| 8,261,093 B1 | 9/2012 | Dhesi et al. |
| 8,271,344 B1 | 9/2012 | Channakeshava et al. |
| 8,307,413 B2 | 11/2012 | Smadja et al. |
| 8,311,893 B2 | 11/2012 | Schoettle |
| 8,327,428 B2 | 12/2012 | Bailey et al. |
| 8,327,429 B2 | 12/2012 | Speyer et al. |
| 8,340,981 B1 | 12/2012 | Cave |
| 8,346,666 B2 | 1/2013 | Lindelsee et al. |
| 8,352,323 B2 | 1/2013 | Fisher |
| 8,380,177 B2 | 2/2013 | Laracey |
| 8,386,309 B2 | 2/2013 | Thibedeau et al. |
| 8,395,242 B2 | 3/2013 | Oliver et al. |
| 8,407,142 B1 | 3/2013 | Griggs |
| 8,423,466 B2 | 4/2013 | Lanc |
| 8,426,884 B2 | 4/2013 | Mizutani et al. |
| 8,452,705 B2 | 5/2013 | Boal |
| 8,489,456 B2 | 7/2013 | Burgess et al. |
| 8,494,915 B2 | 7/2013 | Mesaros |
| 8,498,940 B2 | 7/2013 | Pelegero et al. |
| 8,522,039 B2 | 8/2013 | Hyndman et al. |
| 8,560,389 B2 | 10/2013 | Burgess et al. |
| 8,571,983 B1 | 10/2013 | Blackhurst et al. |
| 8,572,689 B2 | 10/2013 | Radhakrishnan |
| 8,577,804 B1 | 11/2013 | Bacastow |
| 8,583,498 B2 | 11/2013 | Fried et al. |
| 8,584,251 B2 | 11/2013 | McGuire et al. |
| 8,589,271 B2 | 11/2013 | Evans |
| 8,590,008 B1 | 11/2013 | Ellmore |
| 8,590,785 B1 | 11/2013 | Mesaros |
| 8,595,812 B2 | 11/2013 | Bomar et al. |
| 8,606,629 B2 | 12/2013 | Bous et al. |
| 8,620,790 B2 | 12/2013 | Priebatsch |
| 8,637,133 B2 | 1/2014 | Vagliardo |
| 8,650,072 B2 | 2/2014 | Mason et al. |
| 8,650,757 B2 | 2/2014 | Rode |

(56) References Cited

U.S. PATENT DOCUMENTS

| | | |
|---|---|---|
| 8,660,951 B2 | 2/2014 | Calman et al. |
| 8,660,965 B1 | 2/2014 | Bickerstaff |
| 8,665,991 B2 | 3/2014 | Zhu et al. |
| 8,666,660 B2 | 3/2014 | Sartipi et al. |
| 8,682,802 B1 | 3/2014 | Kannanari |
| 8,683,571 B2 | 3/2014 | Zapata et al. |
| 8,700,472 B2 | 4/2014 | Gray |
| 8,732,814 B2 | 5/2014 | Radhakrishnan et al. |
| 8,733,637 B1 | 5/2014 | Cedeno |
| 8,751,298 B1 | 6/2014 | Giordano et al. |
| 8,768,838 B1 | 7/2014 | Hoffman |
| 8,775,243 B2 | 7/2014 | Gillenson et al. |
| 8,781,894 B2 | 7/2014 | Walker et al. |
| 8,788,333 B2 | 7/2014 | Alba et al. |
| 8,788,429 B2 | 7/2014 | Tieken |
| 8,789,162 B2 | 7/2014 | Radhakrishnan |
| 8,799,060 B2 | 8/2014 | Gillenson et al. |
| 8,799,087 B2 | 8/2014 | Martin et al. |
| 8,825,523 B2 | 9/2014 | Gillenson et al. |
| 8,839,383 B2 | 9/2014 | Van Horn |
| 8,850,575 B1 | 9/2014 | Magi Shaashua et al. |
| 8,909,771 B2 | 12/2014 | Heath |
| 8,930,271 B1 | 1/2015 | Ellis et al. |
| 8,943,574 B2 | 1/2015 | Bailey et al. |
| 8,966,423 B2 | 2/2015 | Jain et al. |
| 8,973,102 B2 | 3/2015 | Jakobsson |
| 8,973,819 B2 | 3/2015 | Blackhurst et al. |
| 8,985,442 B1 | 3/2015 | Zhou et al. |
| 8,996,423 B2 | 3/2015 | Johnson et al. |
| 8,997,215 B2 | 3/2015 | Guriappa Srinivas et al. |
| 9,002,924 B2 | 4/2015 | Saretto et al. |
| 9,053,514 B2 | 6/2015 | Bennett et al. |
| 9,055,053 B2 | 6/2015 | Radhakrishnan et al. |
| 9,069,943 B2 | 6/2015 | Radhakrishnan et al. |
| 9,082,153 B2 | 7/2015 | Bennett et al. |
| 9,098,879 B2 | 8/2015 | Bennett et al. |
| 9,100,795 B2 | 8/2015 | Sartipi et al. |
| 9,105,059 B2 | 8/2015 | Gluzberg et al. |
| 9,131,443 B2 | 9/2015 | Takaki |
| 9,146,345 B1 | 9/2015 | Dong et al. |
| 9,152,963 B2 | 10/2015 | Blackhurst et al. |
| 9,183,572 B2 | 11/2015 | Brubaker |
| 9,196,188 B2 | 11/2015 | Kimura |
| 9,200,154 B2 | 12/2015 | Teramoto et al. |
| 9,238,674 B2 | 1/2016 | Manoj et al. |
| 9,275,278 B2 | 3/2016 | Liu et al. |
| 9,324,091 B2 | 4/2016 | Randell et al. |
| 9,355,392 B2 | 5/2016 | Blackhurst et al. |
| 9,379,586 B2 | 6/2016 | Rahman et al. |
| 9,400,005 B2 | 7/2016 | Osborn et al. |
| 9,419,841 B1 | 8/2016 | Kozolchyk et al. |
| 9,514,486 B2 | 12/2016 | Raman |
| 9,519,895 B2 | 12/2016 | Blackhurst et al. |
| 9,519,929 B2 | 12/2016 | Hellal et al. |
| 9,552,603 B1 | 1/2017 | Chanda et al. |
| 9,554,274 B1 | 1/2017 | Castinado et al. |
| 9,576,279 B2 | 2/2017 | Pollin et al. |
| 9,576,294 B2 | 2/2017 | Gebb et al. |
| 9,589,256 B1 | 3/2017 | Thomas et al. |
| 9,600,839 B2 | 3/2017 | Calman et al. |
| 9,633,342 B2 | 4/2017 | Blackhurst et al. |
| 9,639,836 B2 | 5/2017 | Bondesen et al. |
| 9,639,837 B2 | 5/2017 | Laracey |
| 9,639,852 B2 | 5/2017 | Low et al. |
| 10,013,153 B1 * | 7/2018 | Freeman ............... H04L 51/046 |
| 10,255,300 B1 * | 4/2019 | Jhingran ............... G06Q 30/02 |
| 2002/0062249 A1 | 5/2002 | Iannacci |
| 2002/0065720 A1 | 5/2002 | Carswell et al. |
| 2002/0095333 A1 | 7/2002 | Jokinen et al. |
| 2002/0111907 A1 | 8/2002 | Ling |
| 2002/0116214 A1 | 8/2002 | Horn |
| 2002/0116249 A1 | 8/2002 | Ellinger et al. |
| 2002/0152123 A1 | 10/2002 | Giordano et al. |
| 2002/0157029 A1 | 10/2002 | French et al. |
| 2002/0174073 A1 | 11/2002 | Nordman et al. |
| 2002/0186845 A1 | 12/2002 | Dutta et al. |
| 2002/0188561 A1 | 12/2002 | Schultz |
| 2003/0004866 A1 | 1/2003 | Huennekens et al. |
| 2003/0018550 A1 | 1/2003 | Rotman et al. |
| 2003/0045328 A1 | 3/2003 | Natsuno |
| 2003/0055727 A1 | 3/2003 | Walker et al. |
| 2003/0061170 A1 | 3/2003 | Uzo |
| 2003/0064705 A1 | 4/2003 | Desiderio |
| 2003/0065805 A1 | 4/2003 | Barnes, Jr. |
| 2003/0074311 A1 | 4/2003 | Saylors et al. |
| 2003/0088462 A1 | 5/2003 | Carrithers et al. |
| 2003/0105714 A1 | 6/2003 | Alarcon-Luther et al. |
| 2003/0163373 A1 | 8/2003 | Cornateanu |
| 2003/0163787 A1 | 8/2003 | Hay et al. |
| 2003/0171990 A1 | 9/2003 | Rao et al. |
| 2003/0182204 A1 | 9/2003 | Rhee |
| 2003/0217005 A1 | 11/2003 | Drummond et al. |
| 2003/0220835 A1 | 11/2003 | Barnes, Jr. |
| 2004/0006478 A1 | 1/2004 | Alpdemir et al. |
| 2004/0010597 A1 | 1/2004 | Kirschner et al. |
| 2004/0021584 A1 | 2/2004 | Hartz, Jr. et al. |
| 2004/0024638 A1 | 2/2004 | Restis |
| 2004/0024709 A1 | 2/2004 | Yu et al. |
| 2004/0030598 A1 | 2/2004 | Boal |
| 2004/0064373 A1 | 4/2004 | Shannon |
| 2004/0083184 A1 | 4/2004 | Tsuei et al. |
| 2004/0117250 A1 | 6/2004 | Lubow et al. |
| 2004/0122736 A1 | 6/2004 | Strock et al. |
| 2004/0128197 A1 | 7/2004 | Bam et al. |
| 2004/0220964 A1 | 11/2004 | Shiftan et al. |
| 2004/0238622 A1 | 12/2004 | Freiberg |
| 2004/0243468 A1 | 12/2004 | Cohagan et al. |
| 2004/0260653 A1 | 12/2004 | Tsuei et al. |
| 2005/0021363 A1 | 1/2005 | Stimson et al. |
| 2005/0108096 A1 | 5/2005 | Burger et al. |
| 2005/0149436 A1 | 7/2005 | Elterich |
| 2005/0160014 A1 | 7/2005 | Moss et al. |
| 2005/0165682 A1 | 7/2005 | Duke |
| 2005/0197919 A1 | 9/2005 | Robertson |
| 2005/0209921 A1 | 9/2005 | Roberts et al. |
| 2005/0222961 A1 | 10/2005 | Staib et al. |
| 2005/0228717 A1 | 10/2005 | Gusler et al. |
| 2005/0240478 A1 | 10/2005 | Lubow et al. |
| 2006/0027647 A1 | 2/2006 | Deane et al. |
| 2006/0036868 A1 | 2/2006 | Cicchitto |
| 2006/0100951 A1 | 5/2006 | Mylet et al. |
| 2006/0142058 A1 | 6/2006 | Elias et al. |
| 2006/0169764 A1 | 8/2006 | Ross et al. |
| 2006/0287004 A1 | 12/2006 | Fuqua |
| 2006/0289621 A1 | 12/2006 | Foss et al. |
| 2006/0293956 A1 | 12/2006 | Walker et al. |
| 2007/0005427 A1 | 1/2007 | Walker et al. |
| 2007/0017976 A1 | 1/2007 | Peyret et al. |
| 2007/0055594 A1 | 3/2007 | Rivest et al. |
| 2007/0069013 A1 | 3/2007 | Seifert et al. |
| 2007/0073589 A1 | 3/2007 | Vergeyle et al. |
| 2007/0094080 A1 | 4/2007 | Wiken |
| 2007/0094088 A1 | 4/2007 | Mastie et al. |
| 2007/0100773 A1 | 5/2007 | Wallach |
| 2007/0140595 A1 | 6/2007 | Taylor et al. |
| 2007/0150369 A1 | 6/2007 | Zivin |
| 2007/0156842 A1 | 7/2007 | Vermeulen et al. |
| 2007/0194884 A1 | 8/2007 | Didier et al. |
| 2007/0215696 A1 | 9/2007 | Macnish |
| 2007/0219852 A1 | 9/2007 | Anglum |
| 2007/0219984 A1 | 9/2007 | Aravamudan et al. |
| 2007/0223706 A1 | 9/2007 | Gantman et al. |
| 2007/0228157 A1 | 10/2007 | Eckert |
| 2007/0244741 A1 | 10/2007 | Blume et al. |
| 2007/0250920 A1 | 10/2007 | Lindsay |
| 2007/0271141 A1 | 11/2007 | Storm |
| 2007/0272740 A1 | 11/2007 | Palacios |
| 2007/0288372 A1 | 12/2007 | Behar et al. |
| 2008/0010200 A1 | 1/2008 | Smith et al. |
| 2008/0011837 A1 | 1/2008 | Wesley |
| 2008/0019534 A1 | 1/2008 | Reichelt et al. |
| 2008/0040278 A1 | 2/2008 | DeWitt |
| 2008/0059303 A1 | 3/2008 | Fordyce |
| 2008/0065490 A1 | 3/2008 | Novick et al. |

(56) References Cited

U.S. PATENT DOCUMENTS

| | | |
|---|---|---|
| 2008/0067232 A1 | 3/2008 | Whytock et al. |
| 2008/0077486 A1 | 3/2008 | Davis et al. |
| 2008/0089499 A1 | 4/2008 | Hahn et al. |
| 2008/0091528 A1 | 4/2008 | Rampell et al. |
| 2008/0109319 A1 | 5/2008 | Foss |
| 2008/0120155 A1 | 5/2008 | Pliha |
| 2008/0133325 A1 | 6/2008 | De et al. |
| 2008/0140509 A1 | 6/2008 | Amjadi |
| 2008/0147504 A1 | 6/2008 | Suk |
| 2008/0154676 A1 | 6/2008 | Suk |
| 2008/0162279 A1 | 7/2008 | Hershkovitz et al. |
| 2008/0162338 A1 | 7/2008 | Samuels et al. |
| 2008/0162589 A1 | 7/2008 | Rodeheffer et al. |
| 2008/0167965 A1 | 7/2008 | Von Nothaus et al. |
| 2008/0177624 A9 | 7/2008 | Dohse |
| 2008/0189210 A1 | 8/2008 | Sawhney |
| 2008/0195499 A1 | 8/2008 | Meredith et al. |
| 2008/0214210 A1 | 9/2008 | Rasanen et al. |
| 2008/0228637 A1 | 9/2008 | Scipioni et al. |
| 2008/0240702 A1* | 10/2008 | Wassingbo .......... H04N 1/00172 396/310 |
| 2008/0248815 A1 | 10/2008 | Busch |
| 2008/0257958 A1 | 10/2008 | Rothwell et al. |
| 2008/0262928 A1 | 10/2008 | Michaelis |
| 2008/0268876 A1* | 10/2008 | Gelfand .............. H04W 4/029 455/457 |
| 2008/0270243 A1 | 10/2008 | Lewis et al. |
| 2008/0293397 A1 | 11/2008 | Gajdos et al. |
| 2008/0300973 A1 | 12/2008 | DeWitt et al. |
| 2008/0301112 A1* | 12/2008 | Wu .................... G06Q 30/02 |
| 2008/0306826 A1 | 12/2008 | Kramer et al. |
| 2008/0319889 A1 | 12/2008 | Hammad |
| 2009/0002630 A1 | 1/2009 | Lacombe et al. |
| 2009/0005146 A9 | 1/2009 | Kelly et al. |
| 2009/0005152 A9 | 1/2009 | Kelly et al. |
| 2009/0005158 A9 | 1/2009 | Kelly et al. |
| 2009/0005170 A9 | 1/2009 | Kelly et al. |
| 2009/0006191 A1 | 1/2009 | Arankalle et al. |
| 2009/0006203 A1 | 1/2009 | Fordyce, III et al. |
| 2009/0006212 A1 | 1/2009 | Krajicek et al. |
| 2009/0006230 A1 | 1/2009 | Lyda et al. |
| 2009/0019534 A1 | 1/2009 | Bakshi et al. |
| 2009/0037275 A1 | 2/2009 | Pollio |
| 2009/0057396 A1 | 3/2009 | Barbour et al. |
| 2009/0076934 A1 | 3/2009 | Shahbazi et al. |
| 2009/0089131 A1 | 4/2009 | Moukas et al. |
| 2009/0094125 A1 | 4/2009 | Killian et al. |
| 2009/0100529 A1 | 4/2009 | Livnat et al. |
| 2009/0102859 A1 | 4/2009 | Athsani et al. |
| 2009/0119174 A1 | 5/2009 | Pfister |
| 2009/0119190 A1 | 5/2009 | Realini |
| 2009/0140839 A1 | 6/2009 | Bishop et al. |
| 2009/0144164 A1 | 6/2009 | Wane et al. |
| 2009/0150211 A1 | 6/2009 | Bayne |
| 2009/0150265 A1 | 6/2009 | Keld |
| 2009/0150286 A1 | 6/2009 | Barton |
| 2009/0164327 A1 | 6/2009 | Bishop et al. |
| 2009/0171850 A1 | 7/2009 | Yuval |
| 2009/0182630 A1 | 7/2009 | Otto et al. |
| 2009/0182748 A1 | 7/2009 | Walker |
| 2009/0186699 A9 | 7/2009 | Kelly |
| 2009/0192873 A1 | 7/2009 | Marble |
| 2009/0204511 A1 | 8/2009 | Tsang |
| 2009/0222657 A1 | 9/2009 | Bender et al. |
| 2009/0250515 A1 | 10/2009 | Todd et al. |
| 2009/0287557 A1 | 11/2009 | Etheredge et al. |
| 2009/0287564 A1 | 11/2009 | Bishop et al. |
| 2009/0292605 A1 | 11/2009 | Kniaz et al. |
| 2009/0313109 A1 | 12/2009 | Bous et al. |
| 2010/0010918 A1 | 1/2010 | Hunt |
| 2010/0030578 A1 | 2/2010 | Siddique et al. |
| 2010/0030654 A1 | 2/2010 | Dinkin et al. |
| 2010/0036741 A1 | 2/2010 | Cleven |
| 2010/0042477 A1 | 2/2010 | Cavander et al. |
| 2010/0051689 A1 | 3/2010 | Diamond |
| 2010/0057620 A1 | 3/2010 | Li et al. |
| 2010/0064345 A1 | 3/2010 | Bentley et al. |
| 2010/0070359 A1 | 3/2010 | Heasley et al. |
| 2010/0076819 A1 | 3/2010 | Wannier et al. |
| 2010/0076836 A1 | 3/2010 | Giordano et al. |
| 2010/0088166 A1 | 4/2010 | Tollinger |
| 2010/0096449 A1 | 4/2010 | Denzer et al. |
| 2010/0122274 A1 | 5/2010 | Gillies et al. |
| 2010/0122333 A1 | 5/2010 | Noe |
| 2010/0130226 A1 | 5/2010 | Arrasvuori et al. |
| 2010/0145784 A1 | 6/2010 | Sriver et al. |
| 2010/0153205 A1 | 6/2010 | Retter et al. |
| 2010/0161600 A1 | 6/2010 | Higgins et al. |
| 2010/0185529 A1 | 7/2010 | Chesnut et al. |
| 2010/0223165 A1 | 9/2010 | Caiman et al. |
| 2010/0228776 A1 | 9/2010 | Melkote et al. |
| 2010/0241571 A1 | 9/2010 | Mcdonald |
| 2010/0250338 A1 | 9/2010 | Banerjee et al. |
| 2010/0250581 A1 | 9/2010 | Chau |
| 2010/0257066 A1 | 10/2010 | Jones et al. |
| 2010/0257099 A1 | 10/2010 | Bonalle et al. |
| 2010/0268645 A1 | 10/2010 | Martino et al. |
| 2010/0293099 A1 | 11/2010 | Pauker et al. |
| 2010/0299195 A1 | 11/2010 | Nix et al. |
| 2010/0306080 A1 | 12/2010 | Trandal et al. |
| 2010/0312636 A1 | 12/2010 | Coulter et al. |
| 2011/0004921 A1 | 1/2011 | Homer et al. |
| 2011/0010238 A1 | 1/2011 | Postrel |
| 2011/0022483 A1 | 1/2011 | Hammad |
| 2011/0022540 A1 | 1/2011 | Stern et al. |
| 2011/0029364 A1 | 2/2011 | Roeding et al. |
| 2011/0029368 A1 | 2/2011 | Hsu et al. |
| 2011/0034176 A1 | 2/2011 | Lord et al. |
| 2011/0077046 A1 | 3/2011 | Durand et al. |
| 2011/0087531 A1 | 4/2011 | Winters et al. |
| 2011/0093318 A1 | 4/2011 | Guday et al. |
| 2011/0093326 A1 | 4/2011 | Bous et al. |
| 2011/0099104 A1 | 4/2011 | Nybom |
| 2011/0106622 A1 | 5/2011 | Kuhlman et al. |
| 2011/0112897 A1 | 5/2011 | Tietzen et al. |
| 2011/0119155 A1 | 5/2011 | Hammad et al. |
| 2011/0131107 A1 | 6/2011 | Hurst |
| 2011/0137804 A1 | 6/2011 | Peterson |
| 2011/0166992 A1 | 7/2011 | Dessert et al. |
| 2011/0191159 A1 | 8/2011 | Heitman et al. |
| 2011/0191184 A1 | 8/2011 | Blackhurst et al. |
| 2011/0197200 A1 | 8/2011 | Huang et al. |
| 2011/0202466 A1 | 8/2011 | Carter |
| 2011/0218907 A1 | 9/2011 | Dessert et al. |
| 2011/0251892 A1 | 10/2011 | Laracey |
| 2011/0276430 A1 | 11/2011 | Vyas et al. |
| 2011/0276437 A1 | 11/2011 | Mullen et al. |
| 2011/0277016 A1 | 11/2011 | Hockings et al. |
| 2011/0288996 A1 | 11/2011 | Kreutz et al. |
| 2011/0294066 A1 | 12/2011 | Hasegawa |
| 2011/0295744 A1 | 12/2011 | Wisniewski et al. |
| 2011/0320255 A1 | 12/2011 | Gorowitz et al. |
| 2012/0003002 A1 | 1/2012 | Hashimoto |
| 2012/0024947 A1 | 2/2012 | Naelon |
| 2012/0030043 A1 | 2/2012 | Ross et al. |
| 2012/0030047 A1 | 2/2012 | Fuentes et al. |
| 2012/0030109 A1 | 2/2012 | Dooley Maley et al. |
| 2012/0054000 A1 | 3/2012 | Boppert et al. |
| 2012/0054057 A1 | 3/2012 | O'Connell et al. |
| 2012/0059701 A1 | 3/2012 | van der Veen et al. |
| 2012/0066064 A1 | 3/2012 | Yoder et al. |
| 2012/0100915 A1 | 4/2012 | Margalit et al. |
| 2012/0110646 A1 | 5/2012 | Ajitomi et al. |
| 2012/0130785 A1 | 5/2012 | Postrel |
| 2012/0131828 A1 | 5/2012 | August et al. |
| 2012/0136780 A1 | 5/2012 | El-Awady et al. |
| 2012/0143759 A1 | 6/2012 | Ritorto, Jr. et al. |
| 2012/0150643 A1 | 6/2012 | Wolfe et al. |
| 2012/0150731 A1 | 6/2012 | Isaacson et al. |
| 2012/0150740 A1 | 6/2012 | Isaacson et al. |
| 2012/0158525 A1* | 6/2012 | Kae .................... G06Q 30/02 705/14.73 |
| 2012/0158540 A1 | 6/2012 | Ganti et al. |
| 2012/0158586 A1 | 6/2012 | Ganti et al. |

(56) References Cited

U.S. PATENT DOCUMENTS

| | | |
|---|---|---|
| 2012/0160912 A1 | 6/2012 | Laracey |
| 2012/0166334 A1 | 6/2012 | Kimberg et al. |
| 2012/0171237 A1 | 7/2012 | Ching et al. |
| 2012/0179558 A1 | 7/2012 | Fischer |
| 2012/0191565 A1 | 7/2012 | Blank et al. |
| 2012/0197742 A1 | 8/2012 | Johnson |
| 2012/0197743 A1 | 8/2012 | Grigg et al. |
| 2012/0197794 A1 | 8/2012 | Grigg et al. |
| 2012/0203644 A1 | 8/2012 | Phillips |
| 2012/0203700 A1 | 8/2012 | Ornce et al. |
| 2012/0221397 A1 | 8/2012 | Roe et al. |
| 2012/0221446 A1 | 8/2012 | Grigg et al. |
| 2012/0226604 A1 | 9/2012 | Isaacson et al. |
| 2012/0239531 A1 | 9/2012 | McCann |
| 2012/0252365 A1 | 10/2012 | Lam |
| 2012/0254941 A1 | 10/2012 | Levien et al. |
| 2012/0260318 A1 | 10/2012 | Fromentoux et al. |
| 2012/0271712 A1 | 10/2012 | Katzin et al. |
| 2012/0284107 A1 | 11/2012 | Gernaat et al. |
| 2012/0290389 A1 | 11/2012 | Greenough et al. |
| 2012/0290482 A1 | 11/2012 | Atef et al. |
| 2012/0310826 A1 | 12/2012 | Chatterjee |
| 2012/0316941 A1 | 12/2012 | Moshfeghi |
| 2012/0316949 A1 | 12/2012 | Chen |
| 2012/0316992 A1 | 12/2012 | Oborne |
| 2012/0317034 A1 | 12/2012 | Guha et al. |
| 2012/0323669 A1 | 12/2012 | Kohlmeier |
| 2012/0323765 A1 | 12/2012 | Spaulding et al. |
| 2012/0323783 A1 | 12/2012 | Canetto |
| 2012/0330846 A1 | 12/2012 | Light et al. |
| 2013/0009547 A1 | 1/2013 | Shiu et al. |
| 2013/0013499 A1 | 1/2013 | Kalgi |
| 2013/0018738 A1 | 1/2013 | Faires et al. |
| 2013/0024360 A1 | 1/2013 | Ballout |
| 2013/0024525 A1 | 1/2013 | Brady et al. |
| 2013/0036001 A1 | 2/2013 | Wegner et al. |
| 2013/0036048 A1 | 2/2013 | Campos et al. |
| 2013/0036117 A1* | 2/2013 | Fisher .................. G06F 16/487 707/736 |
| 2013/0046589 A1 | 2/2013 | Grigg et al. |
| 2013/0046635 A1 | 2/2013 | Grigg et al. |
| 2013/0054336 A1 | 2/2013 | Graylin |
| 2013/0054470 A1 | 2/2013 | Campos et al. |
| 2013/0060689 A1 | 3/2013 | Oskolkov et al. |
| 2013/0060708 A1 | 3/2013 | Oskolkov et al. |
| 2013/0073377 A1 | 3/2013 | Heath |
| 2013/0073473 A1 | 3/2013 | Heath |
| 2013/0080239 A1 | 3/2013 | Okerlund |
| 2013/0085927 A1 | 4/2013 | Scott |
| 2013/0097002 A1 | 4/2013 | Dishneau et al. |
| 2013/0097683 A1 | 4/2013 | Davis et al. |
| 2013/0110658 A1 | 5/2013 | Lyman et al. |
| 2013/0124346 A1 | 5/2013 | Baldwin et al. |
| 2013/0159178 A1 | 6/2013 | Colon et al. |
| 2013/0159195 A1 | 6/2013 | Kirillin et al. |
| 2013/0161381 A1 | 6/2013 | Roundtree et al. |
| 2013/0166332 A1 | 6/2013 | Hammad |
| 2013/0179341 A1 | 7/2013 | Boudreau |
| 2013/0179954 A1 | 7/2013 | Bidare |
| 2013/0191195 A1 | 7/2013 | Carlson et al. |
| 2013/0191213 A1 | 7/2013 | Beck et al. |
| 2013/0191227 A1 | 7/2013 | Pasa et al. |
| 2013/0204775 A1 | 8/2013 | Midkiff et al. |
| 2013/0204787 A1 | 8/2013 | Dubois |
| 2013/0212007 A1 | 8/2013 | Mattsson et al. |
| 2013/0212019 A1 | 8/2013 | Mattsson et al. |
| 2013/0232067 A1 | 9/2013 | Bhosle et al. |
| 2013/0238413 A1 | 9/2013 | Carlson et al. |
| 2013/0246258 A1 | 9/2013 | Dessert |
| 2013/0246260 A1 | 9/2013 | Barten et al. |
| 2013/0254052 A1 | 9/2013 | Royyuru et al. |
| 2013/0254102 A1 | 9/2013 | Royyuru |
| 2013/0254115 A1 | 9/2013 | Pasa et al. |
| 2013/0262315 A1 | 10/2013 | Hruska |
| 2013/0268437 A1 | 10/2013 | Desai et al. |
| 2013/0304651 A1 | 11/2013 | Smith |
| 2013/0311324 A1 | 11/2013 | Stoll et al. |
| 2013/0318627 A1 | 11/2013 | Lundkvist et al. |
| 2013/0325751 A1 | 12/2013 | McDonough et al. |
| 2013/0334304 A1 | 12/2013 | Yankovich et al. |
| 2013/0346302 A1 | 12/2013 | Purves et al. |
| 2014/0006273 A1 | 1/2014 | Gopinath et al. |
| 2014/0012647 A1 | 1/2014 | Hecht |
| 2014/0025581 A1 | 1/2014 | Calman |
| 2014/0025958 A1 | 1/2014 | Calman |
| 2014/0027922 A1 | 1/2014 | Uzoh |
| 2014/0058938 A1 | 2/2014 | McClung, III |
| 2014/0092130 A1* | 4/2014 | Anderson ......... H04M 1/72454 345/632 |
| 2014/0096215 A1 | 4/2014 | Hessler |
| 2014/0101044 A1 | 4/2014 | Blackhurst et al. |
| 2014/0123244 A1 | 5/2014 | Resch et al. |
| 2014/0129357 A1 | 5/2014 | Goodwin |
| 2014/0130127 A1 | 5/2014 | Toole et al. |
| 2014/0143145 A1 | 5/2014 | Kortina et al. |
| 2014/0143149 A1 | 5/2014 | Aissi |
| 2014/0164030 A1 | 6/2014 | Katagiri |
| 2014/0172707 A1 | 6/2014 | Kuntagod et al. |
| 2014/0187148 A1 | 7/2014 | Taite et al. |
| 2014/0188719 A1 | 7/2014 | Poomachandran et al. |
| 2014/0208401 A1 | 7/2014 | Balakrishnan et al. |
| 2014/0214640 A1 | 7/2014 | Mallikarjunan et al. |
| 2014/0244493 A1 | 8/2014 | Kenyon et al. |
| 2014/0244503 A1 | 8/2014 | Sadlier |
| 2014/0244506 A1 | 8/2014 | Gramling |
| 2014/0245391 A1 | 8/2014 | Adenuga |
| 2014/0245411 A1 | 8/2014 | Meng et al. |
| 2014/0250009 A1 | 9/2014 | Carlson |
| 2014/0278999 A1 | 9/2014 | Calman et al. |
| 2014/0279005 A1 | 9/2014 | Calman et al. |
| 2014/0279214 A1 | 9/2014 | Wagoner-Edwards et al. |
| 2014/0279476 A1 | 9/2014 | Hua |
| 2014/0279554 A1 | 9/2014 | Priebatsch et al. |
| 2014/0279566 A1 | 9/2014 | Verma et al. |
| 2014/0297411 A1 | 10/2014 | Peil |
| 2014/0310764 A1 | 10/2014 | Tippett et al. |
| 2014/0315159 A1 | 10/2014 | Mukherjee et al. |
| 2014/0324690 A1 | 10/2014 | Allen et al. |
| 2014/0330721 A1 | 11/2014 | Wang |
| 2014/0337175 A1 | 11/2014 | Katzin et al. |
| 2014/0359709 A1 | 12/2014 | Nassar et al. |
| 2014/0365301 A1 | 12/2014 | Rappoport et al. |
| 2015/0019317 A1 | 1/2015 | Mitchell |
| 2015/0019439 A1 | 1/2015 | Phillips |
| 2015/0032621 A1 | 1/2015 | Kar et al. |
| 2015/0032627 A1 | 1/2015 | Dill et al. |
| 2015/0039601 A1 | 2/2015 | Harrang et al. |
| 2015/0046339 A1 | 2/2015 | Wong et al. |
| 2015/0081557 A1 | 3/2015 | Kinfoil et al. |
| 2015/0081567 A1 | 3/2015 | Boyle et al. |
| 2015/0088753 A1 | 3/2015 | Van Der Schueren |
| 2015/0089615 A1 | 3/2015 | Krawczyk et al. |
| 2015/0100495 A1 | 4/2015 | Salama et al. |
| 2015/0100788 A1 | 4/2015 | Chastain et al. |
| 2015/0120569 A1 | 4/2015 | Belshe et al. |
| 2015/0120572 A1 | 4/2015 | Slade |
| 2015/0145656 A1 | 5/2015 | Levesque et al. |
| 2015/0161610 A1 | 6/2015 | Sahadevan et al. |
| 2015/0161638 A1 | 6/2015 | Chapman, Jr. |
| 2015/0170149 A1 | 6/2015 | Sharma et al. |
| 2015/0172242 A1* | 6/2015 | Goncalves ............ H04L 67/22 709/206 |
| 2015/0172411 A1* | 6/2015 | Maier .................. H04W 4/029 709/204 |
| 2015/0206131 A1 | 7/2015 | Phillips et al. |
| 2015/0206137 A1 | 7/2015 | Mazarim Fernandes |
| 2015/0220914 A1 | 8/2015 | Purves et al. |
| 2015/0254648 A1 | 9/2015 | Clements et al. |
| 2015/0254653 A1 | 9/2015 | Bondesen et al. |
| 2015/0254664 A1 | 9/2015 | Bondesen et al. |
| 2015/0254698 A1 | 9/2015 | Bondesen et al. |
| 2015/0278903 A1 | 10/2015 | Amjadi |
| 2015/0294303 A1 | 10/2015 | Hanson et al. |
| 2015/0324830 A1 | 11/2015 | Chandrasekaran et al. |

(56) References Cited

U.S. PATENT DOCUMENTS

| | | | |
|---|---|---|---|
| 2015/0348006 A1 | 12/2015 | Taveau et al. | |
| 2016/0019536 A1 | 1/2016 | Ortiz et al. | |
| 2016/0029204 A1 | 1/2016 | Lalwaney | |
| 2016/0055512 A1 | 2/2016 | Godsey et al. | |
| 2016/0125677 A1 | 5/2016 | Williams et al. | |
| 2016/0162853 A1 | 6/2016 | Blackhurst et al. | |
| 2016/0162868 A1 | 6/2016 | Blackhurst et al. | |
| 2016/0171570 A1 | 6/2016 | Dogin et al. | |
| 2016/0189228 A1* | 6/2016 | Vaccari | G06Q 30/0269 705/14.58 |
| 2016/0232518 A1 | 8/2016 | Butler, IV | |
| 2016/0232607 A1 | 8/2016 | Spielman | |
| 2016/0261409 A1 | 9/2016 | French et al. | |
| 2016/0321663 A1 | 11/2016 | Batlle | |
| 2017/0018013 A1 | 1/2017 | Faust et al. | |
| 2017/0039568 A1 | 2/2017 | Tunnell et al. | |
| 2017/0068952 A1 | 3/2017 | Brockmann et al. | |
| 2017/0083966 A1 | 3/2017 | Raman | |
| 2017/0109540 A1 | 4/2017 | Heiman et al. | |
| 2017/0109741 A1 | 4/2017 | Heiman et al. | |
| 2017/0111345 A1 | 4/2017 | Heiman et al. | |
| 2017/0178113 A1 | 6/2017 | Mugford et al. | |
| 2017/0193501 A1 | 7/2017 | Cole et al. | |
| 2017/0195994 A1 | 7/2017 | Cole et al. | |
| 2017/0228878 A1* | 8/2017 | Goldman | G06T 7/344 |
| 2017/0359306 A1 | 12/2017 | Thomas et al. | |
| 2018/0034862 A1 | 2/2018 | Friend et al. | |
| 2018/0082284 A1 | 3/2018 | Gomes et al. | |
| 2018/0191797 A1* | 7/2018 | Javier | G06F 40/174 |
| 2018/0285827 A1* | 10/2018 | Dotan-Cohen | G06Q 10/1095 |
| 2018/0352599 A1 | 12/2018 | Bostick et al. | |

OTHER PUBLICATIONS

Zumiez.com. "The Zumiez Gift Card—CombineYour Gift Cards." 1 page.http://www.zumiez.com/giftcard/index/combine. Retrieved Jan. 8, 2013.

The Laws, Regulations, Guidelines, and Industry Practices that Consumers Who Use Gift Cards; Phillip Keitel; Jul. 2008.

MasterCard 2005.

PrePaid Gift Cards; May 2012.

Lane, "History of APIs"; APIEvangelist.com; Dec. 2012, 11 pages.

Digital Wallet to Pay for Travel Hasn't Arrived Yet, Orlando Sentinel[Orlando FL], Jan. 27, 2013; p. J.6.

World's First and Only Global Wallet Sees Strong User Adoption with 150 Million Miles Loaded to Cash in First Month of Launch, Business Wire, Nov. 28, 2012, Zurich.

Bielski, L. (2000). Aggregators aka "screenscrapers". American Bankers Association. ABA Banking Journal, 92(5), 17-50 Retrieved from http://search.proquest.com/docview/218443115?ac-countid-14753.

Howell, J., & Wei, J. (2010). Value Increasing Model in Commercial E-Banking. The Journal of Computer Information Systems, 51(1), 72-81. Retrieved from http://search.proquest.com/docview/ 808409721?accountid=14753.

Finovate Startup 2009 Video Archives » Expensify (retrieved online from <http://www.finovate.com/startup09vid/axpensify.html>and<http://www.finovate.com/startup09vid/videos/ quicktime/ Expensify.mov>) pp. 1-3 screenshots of website hosting video presentation, pp. 4-15 screen shots of the Expensify video presentation.

Expensify Blog Oct. 2009, retrieved online from <http://blog.expensify.com/2009/10/» pp. 8.

International Search Report and the Written Opinion for International Application No. PCT/US2010/029811 dated Jun. 1, 2010.

International Preliminary Reporton Patentability for International Application No. PCT/US2010/029811 dated Oct. 20, 2011.

Welch, M. J. (2010). Addressing the challenges of underspecification in web search. (Order No. 3446833, University of California, Los Angeles). ProQuest Dissertations and Theses, 137. Retrieved from http://search.proquest.com/locview/85810500?accountid=14753. (858101500).

K.J. Jeevan, & Padhi, P. (2006). A selective review of research in content personalization. Library Review, 55(9), 356-586. doi:http://dx.doi.org/10.1108/00242530610706761.

Lissner, P. A. (2007). Chi-thinking: Chiasmus and cognition. (Order No. 3297307, University of Maryland, College 'ark). ProQuest Dis-sertations and Theses, 487. Retrieved from http://search. proquest. com/docview/304851937?accountid=14753. (304851937).

International Search Report and Written Opinion for International Application No. PCT/US2012/027892 dated Jun. 14, 2012.

International Search Report and Written Opinion for International Application No. PCT/US2012/027912 dated Jun. 8, 2012.

International Search Report and Written Opinion for International Application No. PCT/US2012/028036 dated May 28, 2012, Sep. 14, 2021.

International Search Report and Written Opinion for International Application No. PCT/US2012/028008 dated May 22, 2012.

International Search Report and Written Opinion for International Application No. PCT/US2012/048697 dated Sep. 24, 2012.

International Search Report and Written Opinion for International Application No. PCT/US2012/027890 dated Feb. 5, 2013.

* cited by examiner

DATA TRANSMISSION TO A NETWORKED RESOURCE BASED ON CONTEXTUAL INFORMATION

CROSS-REFERENCE TO RELATED APPLICATIONS

This application is a continuation of patent application with Ser. No. 15/630,289 filed Jun. 22, 2017 and titled "DATA TRANSMISSION TO A NETWORKED RESOURCE BASED ON CONTEXTUAL INFORMATION", the entire disclosure of which is hereby incorporated herein by reference.

FIELD

The present invention relates to systems, methods, and computer program products for accessing and extracting context-based data to provide targeted supplemental resources to users in an integrated environment.

BACKGROUND

Sending notifications to uses requires large quantities of data storage and large amounts of processing capacity. When an entity sends targeted notifications to users, there is a greater likelihood that the users actually take an action associated with the notification, and it reduces the amount of data storage and processing capacity required when compared to non-targeted notification. By sending notifications to a subset of users from a plurality of users (excluding other users), an entity reduces the data and storage and processing capacity without affecting the actions taken on such notifications. Therefore, there is a need for a system to more accurately and efficiently provide notifications.

SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

Generally, systems, computer products, and methods are described herein for the transmission of resources over a network based on extracted contextual information. More specifically, embodiments of the invention described herein provide an integrated environment to access contextual data to extract contextual information and provide targeted supplemental resources to network device. By targeting resources to networked devices, the invention reduces the overall number of resources that need to be provided to the device and helps to keep user activity confined to the integrated environment.

In one embodiment of the invention the system is configured to identify user information for a user; access contextual data, wherein the contextual data is accessed from user computer systems or entity computer systems; extract contextual information from the accessed contextual data; identify supplemental resources to present to the user based on the user information and the contextual information; transmit a notification of the supplemental resources to the user, wherein the notification includes a request to the user to accept or deny the supplemental resources; receive a user selection to accept the supplemental resources, wherein the user selection is received from the user computer systems; and store the supplemental resources as being associated with the user or a resource pool of the user.

In another embodiment, the system is further configured to create a link with the user computer system; open an augmented reality application on the user computer system, wherein the augmented reality application is configured to: (i) capture image data from an image capture device operatively coupled to the user computer system; identify a plurality of objects in the image data; determine an identity of at least one object from the image data; and identify supplemental resources to present to the user based on the user information and the contextual information, wherein identifying supplemental resources is based on the at least one object from the image data; and indicate on a display of the user computer systems the notification of the supplemental resources with the at least one object.

In another embodiment, the system is further configured to receive the location of the user, wherein the location is received from a location determination device through the user computer systems; determine, based on the location of the user, that the user is proximate to a previous interaction for which the user accepted previous supplemental resources; wherein the notification further includes an indication that the user is proximate to the previous interaction.

In another embodiment, the system is further configured to receive contextual data, wherein the contextual data is an image, and the system is further configured to identify in the image at least one object, wherein the supplemental resources are identified based on the at least one object in the image. The system may also provide notification in such an embodiment by transmitting the image integrated with supplemental resource to the user computer system. In another embodiment, identifying the at least one object comprises employing optical character recognition (OCR) to identify at least one object in the image.

In another embodiment, integrating the notification in the image is integrating an indicator in the image, and wherein the user selects the indicator to view the notification of supplemental resources.

In another embodiment of the invention, the contextual data is an event, wherein the supplemental resources are based on the at least one object in the image. In such embodiments, the system may determine the event from a user calendar, wherein the system accesses the user calendar through the user computer system or an entity system. In such embodiments, the system may further be configured to receive permission from the user to access the social networking account of the user; and identify the event for which the user is interested, wherein the user is tagged for the event or the user has otherwise indicated that the user is going to the event.

In another embodiment of the invention, the system is further configured to receive a request from an interaction entity to process an interaction between the interaction entity and the user, wherein the interaction is a transaction for a product; determine that the transaction for the product or with the interaction entity meets requirements of the supplemental resources that the user previously accepted; allocate resources in a resource pool of the user for the interaction for the product with the interaction entity; apply the supplemental resources to the resource pool of the user after the resources from the resource pool have already been allocated; and wherein the interaction entity is unaware that the user accepted the supplemental resources and that the supplemental resources have been applied to the user's resource pool at a time the supplemental resources are applied.

BRIEF DESCRIPTION OF THE DRAWINGS

Figure 1:
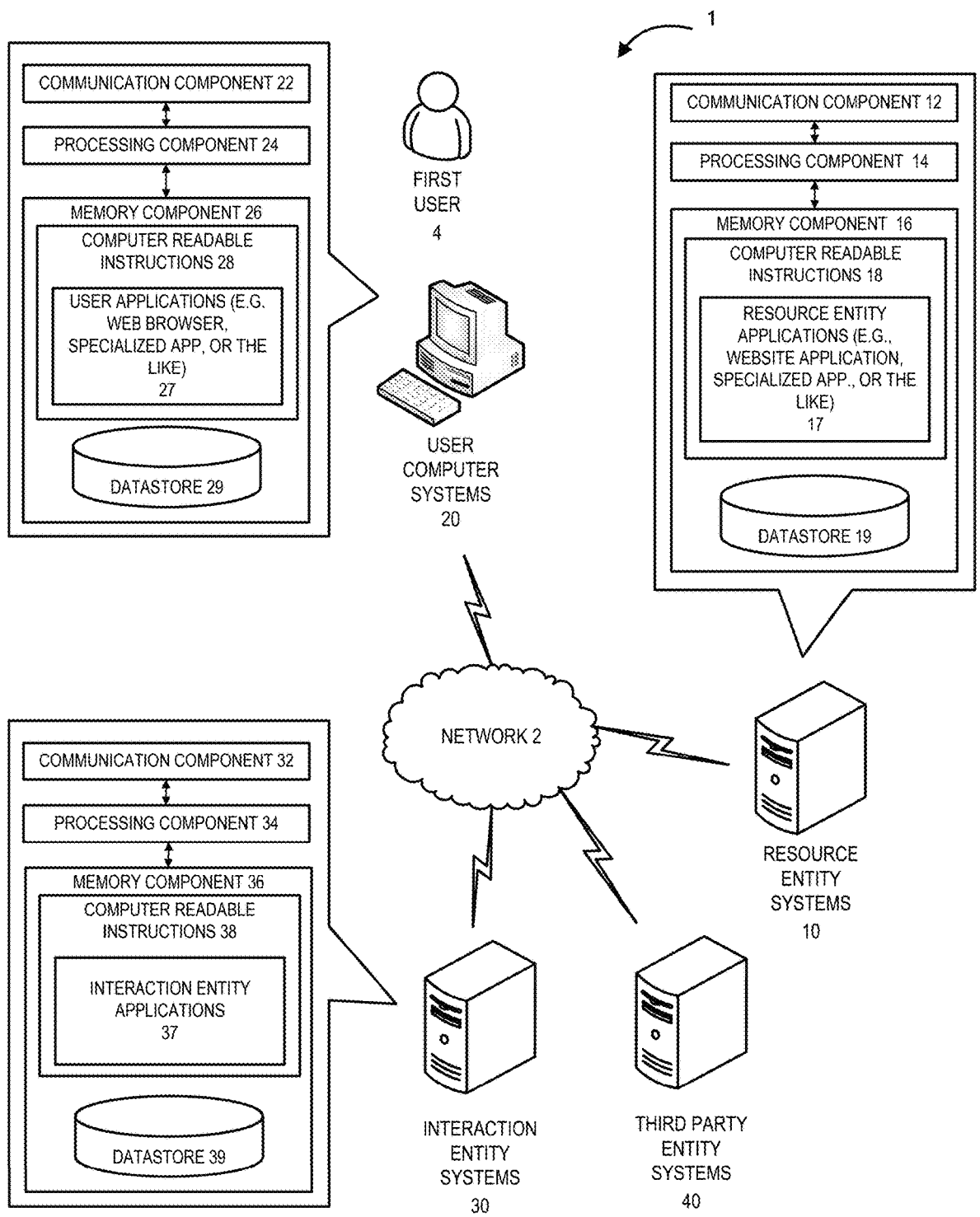

Having thus described embodiments of the invention in general terms, reference will now be made to the accompanying drawings, where:

FIG. 1 is a diagram illustrating an exemplar environment of the system, in accordance with embodiments of the present invention.

Figure 2:
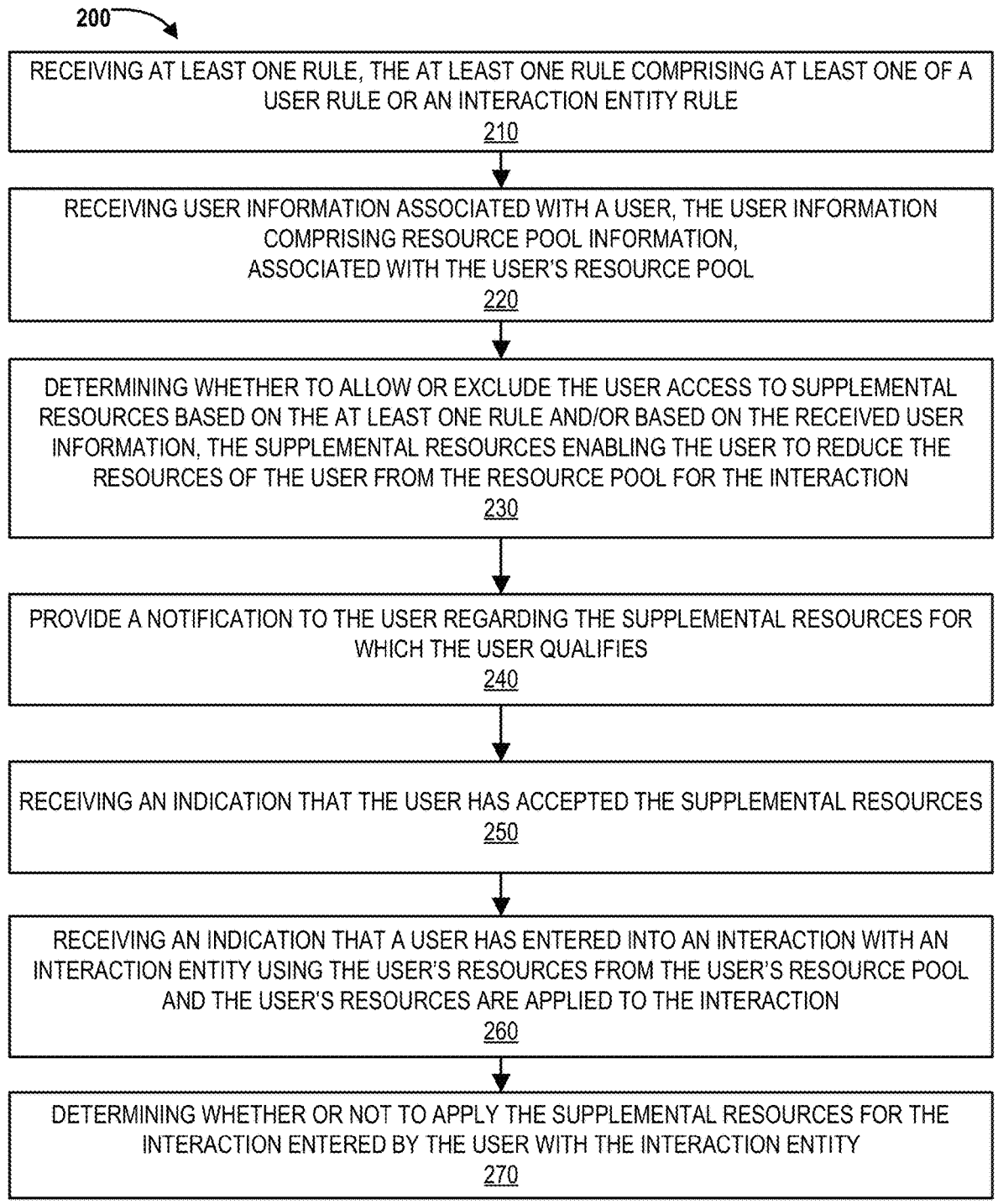

FIG. 2 is a flowchart illustrating a general process flow for queuing input information for performing rule-based notification association, in accordance with embodiments of the present invention.

Figure 3:
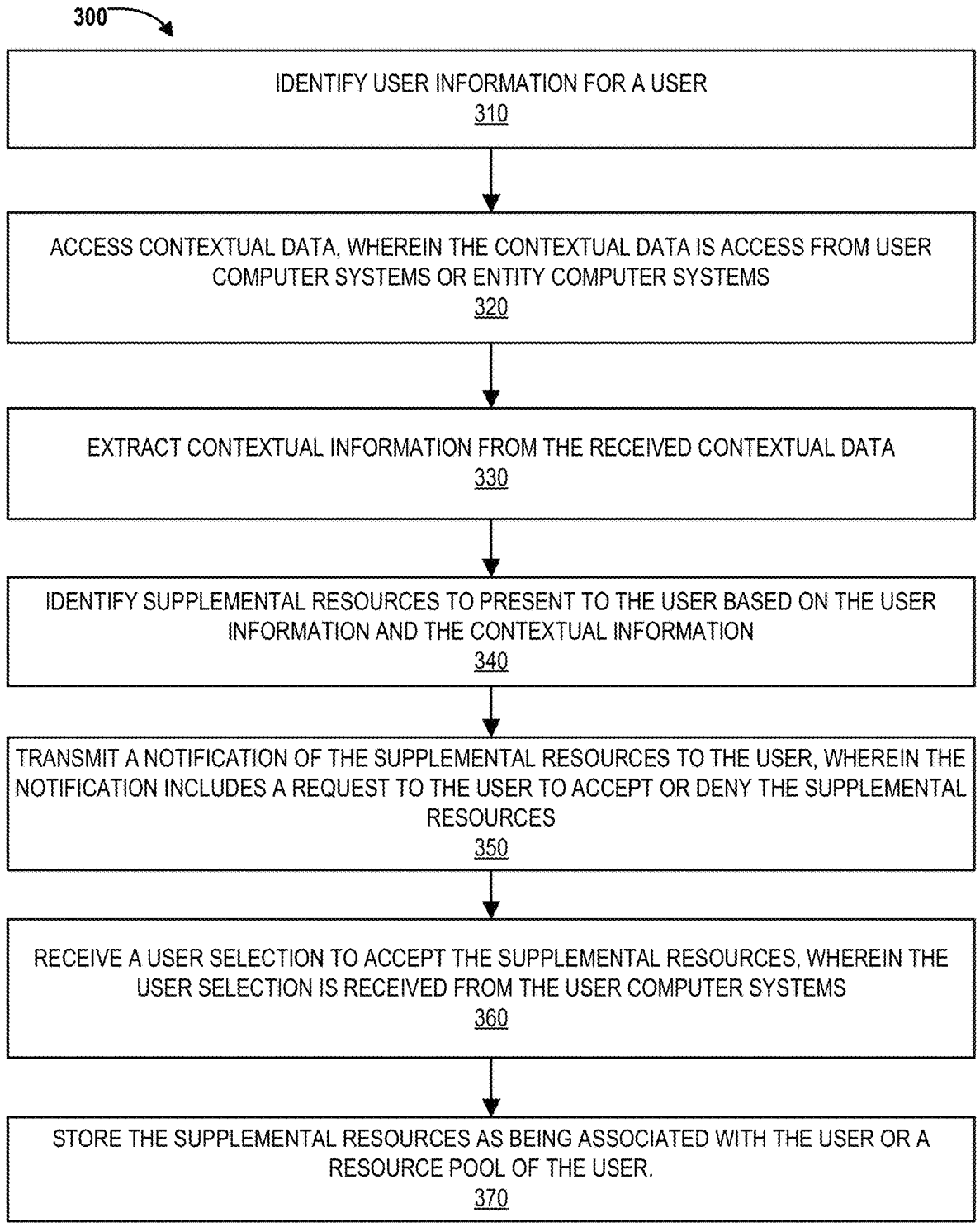

FIG. 3 is a flowchart illustrating a general process flow for using contextual data obtained from a user to provide supplemental resources relevant to the user, in accordance with embodiments of the present invention.

Figure 4:
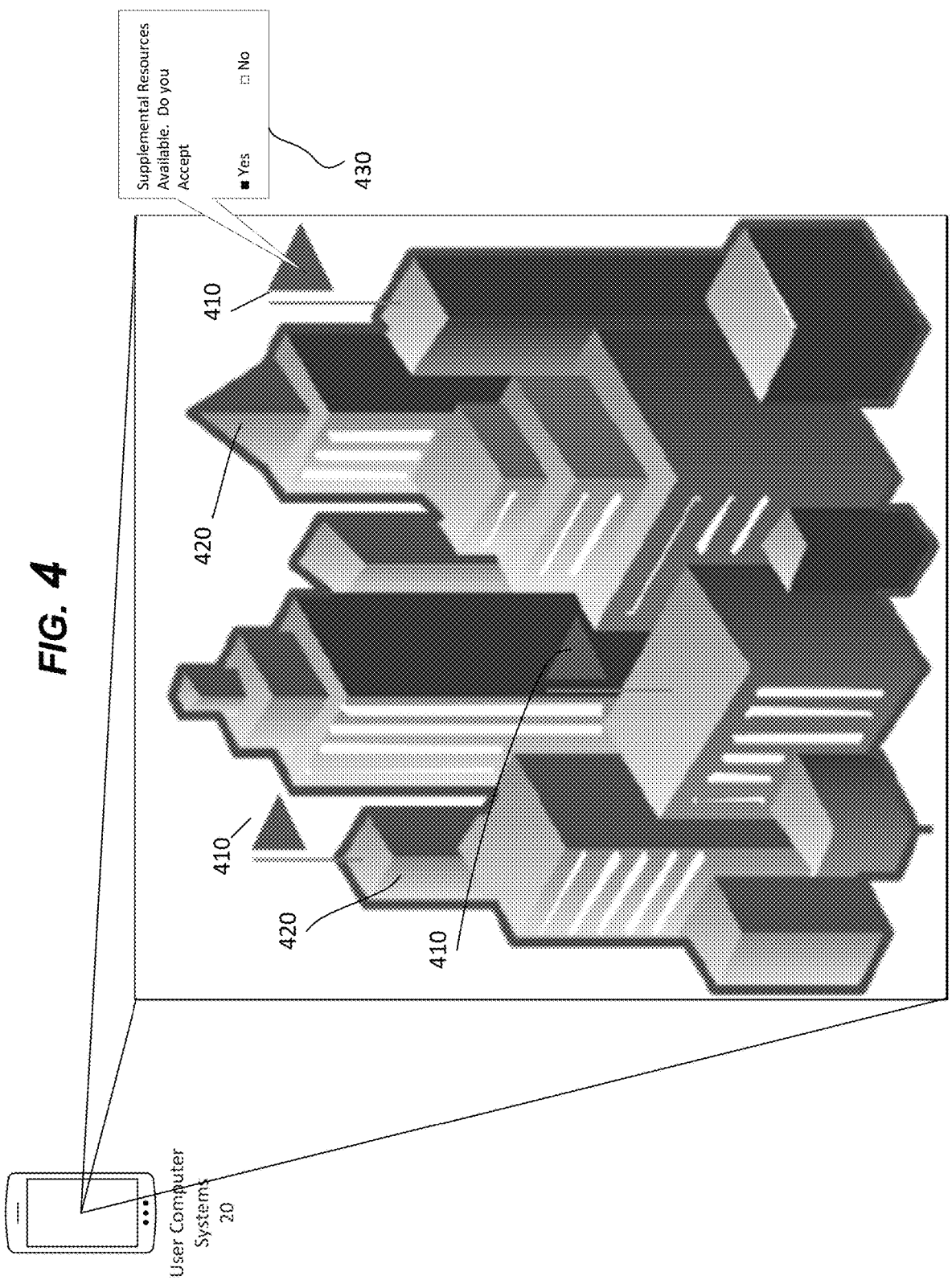

FIG. 4 is an illustration of an integrated notification system for providing notifications within an augmented reality environment, in accordance with embodiments of the present invention.

DETAILED DESCRIPTION OF EMBODIMENTS OF THE INVENTION

Embodiments of the invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. In the following description, for purposes of explanation, numerous specific details are set forth in order to provide a thorough understanding of one or more embodiments. It may be evident; however, that such embodiment(s) may be practiced without these specific details. Like numbers refer to like elements throughout.

Systems, methods, and computer program products are herein disclosed that provide for the transmission of resources over a network based on extracted contextual information. Embodiments of the invention described in more detail herein provided an integrated environment to access contextual information and provide targeted supplemental resources to a network device. The present invention solve at least the technical problem of limiting the resources sent over the network by providing only targeted resources to specific users on the network based on contextual information extracted from the users' contextual data. Moreover, the integrated environment described herein is designed in such a manner that allows users to user entity resources from a resource pool without the user having to leave the integrated environment. These advantages will be described in greater detail and with reference to the accompanying figures below.

FIG. 1 illustrates a supplemental resource system environment 1, in accordance with embodiments of the invention. As illustrated in FIG. 1, one or more resource entity systems 10 are operatively coupled, via a network 2, to one or more user computer systems 20, one or more interaction entity systems 30, one or more third-party systems 40, and/or one or more other systems (not illustrated). In this way, the user 4 (e.g., one or more associates, employees, agents, contractors, sub-contractors, third-party representatives, customers, or the like), through a user application 27 (e.g., web browser, dedicated or specialized application, or the like), may access resource entity applications 17 (e.g., website, dedicated or specialized application, or the like) of the resource entity systems 10 to receive supplemental resources for interactions with interaction entities.

The network 2 may be a global area network (GAN), such as the Internet, a wide area network (WAN), a local area network (LAN), or any other type of network or combination of networks. The network 2 may provide for wireline, wireless, or a combination of wireline and wireless communication between systems, services, components, and/or devices on the network 2.

As illustrated in FIG. 1, the resource entity systems 10 generally comprise one or more communication components 12, one or more processing components 14, and one or more memory components 16. The one or more processing components 14 are operatively coupled to the one or more communication components 12 and the one or more memory components 16. As used herein, the term "processing component" generally includes circuitry used for implementing the communication and/or logic functions of a particular system. For example, a processing component 14 may include a digital signal processor component, a microprocessor component, and various analog-to-digital converters, digital-to-analog converters, and other support circuits and/or combinations of the foregoing. Control and signal processing functions of the system are allocated between these processing components according to their respective capabilities. The one or more processing components 14 may include functionality to operate one or more software programs based on computer-readable instructions 18 thereof, which may be stored in the one or more memory components 16.

The one or more processing components 14 use the one or more communication components 12 to communicate with the network 2 and other components on the network 2, such as, but not limited to, the components of the user computer systems 20, the interaction entity systems 30, third-party systems 40, or other systems. As such, the one or more communication components 12 generally comprise a wireless transceiver, modem, server, electrical connection, electrical circuit, or other component for communicating with other components on the network 2. The one or more communication components 12 may further include an interface that accepts one or more network interface cards, ports for connection of network components, Universal Serial Bus (USB) connectors and the like.

As further illustrated in FIG. 1, the resource entity systems 10 comprise computer-readable instructions 18 stored in the memory component 16, which in one embodiment includes the computer-readable instructions 18 of the resource entity application 17 (e.g., website application, dedicated application, or the like). In some embodiments, the one or more memory components 16 include one or more data stores 19 for storing data related to the resource entity systems 10, including, but not limited to, data created, accessed, and/or used by the resource entity application 17. The resource entity application 17 may be utilized to provide and/or store not only resources for the user 4, but also supplemental resources for the user, and apply such supplemental resources to the interactions of the user 4.

As illustrated in FIG. 1, users 4 may access the resource entity application 17, or other applications, through a user computer system 20. The user computer system 20 may be a desktop, mobile device (e.g., laptop, smartphone device, PDA, tablet, or other mobile device), or any other type of computer that generally comprises one or more communication components 22, one or more processing components 24, and one or more memory components 26.

The one or more processing components 24 are operatively coupled to the one or more communication components 22, the one or more image capture components 25, and the one or more memory components 26. The one or more processing components 24 use the one or more communication components 22 to communicate with the network 2 and other components on the network 2, such as, but not limited to, the resource entity systems 10, the interaction entity systems 30, third-party systems 40, and/or other systems. As such, the one or more communication components 22 generally comprise a wireless transceiver, modem, server, electrical connection, or other component for communicating with other components on the network 2. The one or more communication components 22 may further include an interface that accepts one or more network interface cards, ports for connection of network components, Universal Serial Bus (USB) connectors and the like. Moreover, the one or more communication components 22 may include a keypad, keyboard, touch-screen, touchpad, microphone, mouse, joystick, other pointer component, button, soft key, and/or other input/output component(s) for communicating with the users 4.

As illustrated in FIG. 1, the user computer systems 20 may have computer-readable instructions 28 stored in the one or more memory components 26, which in one embodiment includes the computer-readable instructions 28 for user applications 27, such as dedicated applications (e.g., apps, applet, or the like), portions of dedicated applications, a web browser or other apps that allow the user 4 to take various actions, including allowing the user 4 to access applications located on other systems, or the like. In some embodiments, the user 4 utilizes the user applications 27, through the user computer systems 20, to access the resource entity applications 17 to accept supplemental resources. Moreover, in some embodiments the user 4 may also utilize the user applications 27, through the user computer systems 20, to enter into interactions with the interaction entity, through the interaction entity applications 37 and/or interaction entity systems 30.

As illustrated in FIG. 1, one or more interaction entity systems 30 may communicate with the resource entity systems 10 and/or user computer systems 20 to provide supplemental resources to the resource entity and/or to engage in interactions with the user 4. As such, the interaction entity systems 30 are operatively coupled, via a network 2, to the one or more resource entity systems 10, the user computer systems 20, the third party systems 40, and/or other systems. The interaction entity systems 30 generally comprise one or more communication components 32, one or more processing components 34, and one or more memory components 36.

The one or more processing components 34 are operatively coupled to the one or more communication components 32, and the one or more memory components 36. The one or more processing components 34 use the one or more communication components 32 to communicate with the network 2 and other components on the network 2, such as, but not limited to, the components of the resource entity systems 10, the user computer systems 20, the third party systems 40, and/or other systems. As such, the one or more communication components 32 generally comprise a wireless transceiver, modem, server, electrical connection, or other component for communicating with other components on the network 2. The one or more communication components 32 may further include an interface that accepts one or more network interface cards, ports for connection of network components, Universal Serial Bus (USB) connectors and the like.

As illustrated in FIG. 1, the interaction entity systems 30 may have computer-readable instructions 38 stored in the one or more memory components 36, which in one embodiment includes the computer-readable instructions 38 of interaction entity applications 37 that allow for the interactions with the user 4 and/or the resource entity regarding supplemental resources, as will be described herein.

Moreover, as illustrated in FIG. 1, third party entity systems 40, and/or other like systems are operatively coupled to the resource entity systems 10, the user computer systems 20, and/or the interaction entity systems 30, through the network 2. The third party entity systems 40 and/or other like systems have components the same as or similar to the components described with respect to the resource entity systems 10, the user computer systems 20, and/or the interaction entity systems 30 (e.g., one or more communication components, one or more processing components, and one or more memory devices with computer-readable instructions of one or more applications, one or more datastores, or the like). Thus, the third party systems 40 and/or other like systems communicate with the resource entity systems 10, the user computer systems 20, the interaction entity systems 30, and/or each other in same or similar way as previously described with respect to the resource entity systems 10, the user computer systems 20, and/or the interaction entity systems 30.

The present invention disclosed herein relates generally to a resource entity providing a notification to a user that results in the user being able to take an action, such that a user may enter into a future interaction using user's resources from a resource pool and supplemental resources related to the notification and/or action. In some embodiments, the resource entity may be a financial institution and the interaction entity may be a merchant, but it should be understood that the entities may be another third party entity acting on its own or as a third-party for the resource entity or interaction entity. In some embodiments, the resource entity or the interaction entity may be acting on behalf of one another. The notification may relate to supplemental resources (e.g., and offer, discount, rebate, or the like) that the user may utilize for a product (e.g., good or service) during an interaction (e.g., transaction, or the like) with an interaction entity. The notification may be presented to the user via various channels, such as through the user's online resource pool (e.g., online banking account, or the like), social network account, email, text message, or other like channel. In some embodiments, the user action may be the acceptance of the notification (e.g., acceptance of the supplemental resources). When the user accepts the supplemental resources, the supplemental resources are activated so that if the user uses eligible resources from an eligible resource pool (e.g., as determined by the resource entity, the interaction entity, third party entity, or the like) to enter into the interaction, the user receives the benefit associated with the supplemental resources. In other embodiments, the supplemental resources may be automatically activated if the user has previously chosen to automatically activate supplemental resources associated with particular interactions (e.g., associated with particular interaction entities or products). In some embodiments, the resource entity may determine that a user may choose among multiple eligible resources pools in order to enter into an interaction associated with the supplemental resources.

As will be described herein in further detail later, in some embodiments the present invention provides a targeted integrated interface that integrates information related to interactions that the user 4 has with interaction entities with resources used from the resource entities, and provides targeted supplemental resources to the user 4 through the targeted integrated interface. The present invention provides at least two different improvements to the technological environment of interactions that occurs over a network 2, such as the Internet. First, the present invention presents a targeted integrated interface that presents targeted supplemental resources to the user 4 in order to keep the user 4 within the resource entity systems 10 and to make the user 4 more likely to use the resources of the resource entity by providing supplemental resources to the user 4 for future interactions with various interaction entity systems 30. Secondly, the present invention reduces the storage and processing capacity required by the resource entity systems 10 to present the targeted supplemental resources to the users 4. Because the targeted integrated interface is utilized to present the targeted supplemental resources to the user 4, the number of notifications presented to the user 4 is greatly reduced because the notifications are specified to the user 4 and the user 4 can select the targeted supplemented resources that the user 4 wants to use.

Referring now to FIG. 2, a general process flow 200 is provided for implementing rule-based supplemental resource association. At block 210, the method comprises receiving at least one rule, the at least one rule comprising at least one of a user rule or an entity rule (e.g., a filtering rule that excludes or allows the user access to supplemental resources based on the user and/or the entities). As used herein, a user rule is a rule that determines the users 4 that can access or that are excluded from the supplemental resources (e.g., allows or excludes some users from receiving and/or using the supplemental resources). In some embodiments, the at least one user rule may comprise an affinity rule. Therefore, if the user 4 and interaction entity already have an existing relationship (e.g., for providing and/or using supplemental resources), these users may be allowed or excluded from receiving the supplemental resources through the resource entity. The affinity rule comprises at least one of a full affinity rule or a partial affinity rule. When the affinity rule comprises a full affinity rule, the user is completely allowed or excluded from receiving supplemental resources if the interaction entity already has an existing relationship with the user 4. When the affinity rule comprises a partial affinity rule, the user 4 is allowed to or excluded from receiving supplemental resources associated with a particular product, category of products, an entity, industry, or the like associated with a particular interaction entity that already has an existing relationship with the user 4 for the particular product, category of products, entity, industry, or the like; however, the user 4 may receive supplemental resources associated with other products, categories of products, entities, industries, or the like associated with the particular entity. Additionally or alternatively, the user 4 may be allowed to or excluded from receiving supplemental resources associated with a competitor of a particular interaction entity if that particular interaction entity already has an existing relationship with the user 4.

In some embodiments, an entity rule is a rule that allows or excludes some interaction entities from providing supplemental resources to users 4 associated with an interaction entity. In some embodiments, the at least one entity rule comprises a category code rule. Therefore, an interaction entity associated with a predetermined category code is allowed to or excluded from providing supplemental resources. However, the resource entity managing the resource pool of the user 4 may set up a list of interaction entities that trigger exceptions. Interaction entities that trigger exceptions can provide supplemental resources even if these entities are associated with the excluded category codes.

It should be understood that specific user rules and/or entity rules have been described herein; however, any user rules or entity rules may be utilized to determine what users 4 have access to supplemental resources.

In some embodiments, the user information comprises other information as well. For example, in some embodiments, the user information may comprise additional information associated with the user, such as social network information associated with the user's social network account or other non-account related information associated with the user.

In some embodiments, the user information comprises other information as well. For example, in some embodiments, the user information comprises personal information, residence address history, education information, or the like) associated with the user. In some embodiments, the personal information further comprises social network information associated with the user's social network account or other non-account related information associated with the user. In some embodiments, the user information further comprises user information (e.g., personal information, account information, or the like) associated with the user's immediate or extended family members or contacts (e.g., as determined from social network information).

At block 230, the method comprises determining whether to allow a user access to supplemental resources based on the at least one rule and/or based on the received user information. It should be understood that the resource entity may have agreements with interaction entities to for providing supplemental resources to the user 4 if the user 4 enters into interactions with the interaction entities. The supplemental resources enable the user 4 to apply the supplemental resources to an interaction with an interaction entity in order to reduce the resources the user 4 uses from the user's resource pool to complete the interaction. As such, using the at least one rule and the received user information, the resource entity determines the targeted supplemental resources to present to the user 4. By using targeted supplemental resources, the resource entity can identify the users 4 most likely to use the supplemental resources in order to keep the users from leaving the resource entity applications 17 and keep the users using the resources of the resource entity for the interactions with the interaction entities, and also reduces the storage capacity and processing capacity required to present the supplemental resources to the users 4 (e.g., because the supplemental resources are targeted to specific users 4).

At block 240 in FIG. 2, when a user 4 qualifies for supplemental resources the resource entity may provide a notification to a user 4 regarding the supplemental resources. It should be understood that the user may receive a notification regarding the targeted supplemental resources from the resource entity. For example, the notification of the supplemental resources may be presented to the user 4 through the resource entity application 17 (e.g., user's online account accessed through the user computer systems 20), the social networking account of the user 4, electronic communication with the user 4 (e.g., user's e-mail, text message, sms message, other messaging channel, or the like), or the like, as will be described in further detail later.

As illustrated by block 250, regardless of how the supplemental resources are presented, an indication of an action is received regarding the one or more supplement resources accepted by or for the user 4. The user 4 may take an action by accepting one or more of the supplemental resources presented to the user 4. In other embodiments of the invention, one or more of the plurality of supplemental resources may be added automatically base on the one or more supplemental resources determined for the use as previously discussed with respect to block 230 (e.g., all of the supplemental resources for the user 4 are automatically added, or the like).

At block 240 an indication is received that a user 4 has entered into an interaction with an interaction entity using the user's resources from the resource pool of the user 4 at the resource entity. The indication may include the product associated with the interaction, the amount of the interaction, and/or the resource pool used by the user 4 to enter into the interaction. Should the interaction be allowed (e.g., there are no interaction limits on the user preventing the interaction, the interaction entity is allowed, the user's resource pool can cover the balance, or the like) resources from the user's resource pool are allocated for the interaction.

At block 250 as will be described, in some embodiments, the supplemental resources may be applied at a point of time in the future when the interaction that qualifies for the supplemental resources is processed.

In some embodiments, when an interaction is processed by the resource entity at a time in the future (e.g., at settlement time or processing time after the interaction is entered), the system determines whether the supplemental resources are still active and whether the supplemental resources are still valid with respect to both the user 4 and the interaction entity interacting with the user 4. This post-transaction process may be referred to as a supplemental resource reconciliation process. The supplemental resources are still active if the supplemental resources have not been revoked by at least one of the resource entity or the interaction entity, and/or if the supplemental resources have not expired.

The supplemental resources are valid with respect to the interaction entity if the interaction entity is not excluded under any entity rules. In some embodiments, in order for the supplemental resources to be valid, the interaction entity cannot be excluded under any entity rules that were in force at the time of the interaction. Additionally or alternatively, in some embodiments, in order for the supplemental resources to remain valid, the interaction entity cannot be excluded under any entity rules that are in force at the time of settlement of the interaction. Therefore, in some embodiments, the interaction entity cannot be excluded under any new entity rules that have been introduced since the interaction.

The supplemental interactions are valid for the user 4 if the user 4 is not excluded under any user rules. In some embodiments, in order for the supplemental resources to be valid, the user 4 cannot be excluded under any user rules that were in force at the time of the interaction. Additionally or alternatively, in some embodiments, in order for the supplemental resources to remain valid, the user cannot be excluded under any user rules that are in force at the time of settlement of the interaction. Therefore, in some embodiments, the user cannot be excluded under any new user rules that have been introduced since the purchase transaction.

In still other embodiments of the invention, the supplemental resources may also meet specific interaction rules regarding the interaction of the user with the interaction entity. The interaction rules may be set by the interaction entity and/or the resource entity. For example, the interaction rules may require the user 4 to enter the interaction at a specific date, time of day, location, interaction channel (e.g., in person, over the Internet, over a telephone, or the like), for a specific amount of resources, or the like. Moreover, the interaction rules may require the user 4 to use resources from specific resource pools.

If the user rules, interaction entity rules, and/or the interaction rules are met at the time of the interaction and/or time of settlement, the supplemental resources are still valid and the resource entity applies the amount of supplemental resources to the user's resource pool and/or reduces the resources provided to the interaction entity by the amount of the supplemental resources. In some embodiments, if at least one of the user rules, interaction entity rules, and/or the interaction rules are not met at the time of the interaction and/or settlement, the supplemental resources are invalid and the resource entity does not apply the amount of supplemental resources to the user's resource pool and/or applies the full amount of resources to the interaction entity. In alternate embodiments, even if at least one of the user rules, interaction entity rules, and/or interaction rules are not met at the time of settlement, the supplemental resources remain valid as long as the all of the rules were met at the time of the interaction, and consequently the resource entity applies the supplemental resources to the user's resource pool and reduces the resources provided to the interaction entity by the amount of the supplemental resources.

In some embodiment of the invention, the supplemental resources are presented to the user through an augmented reality application on the user computer system 20. In such an embodiment, the augmented reality application In some embodiments, the supplemental resources (e.g., a notification of the access to the supplemental resources) are presented via at least one of a targeted integrated interface associated with the user's resource pool (e.g., online banking account, mobile banking account on a portable mobile communication device, or the like), via a targeted integrated interface associated with the user's social network account, or the like. In some embodiments, a notification of the supplemental resources are inserted into or presented alongside (e.g., on the right, left, top, bottom side of an electronic interfaces related to an interaction with an interaction entity) the interaction history that is presented on the user's online resource pool interactions (e.g., online interaction account). Therefore, for example, if ten interactions are listed in the interaction history list, the notification of the supplemental resources may be presented between the fourth and fifth interactions on the list. In some embodiments, the notification of the supplemental resources may be related to the transaction which the offer is presented alongside (e.g., the fourth and/or fifth transaction in the above example). For example, if the fourth interaction is a transaction for product 'A' from interaction entity 'A,' the supplemental resources are for a transaction for product 'A' (e.g., from any interaction entity) or for a transaction from interaction entity 'A' (e.g., for any product) or for a transaction of product 'A' from interaction entity 'A.' Alternatively, the supplemental resources may be for a transaction of a substitute product 'A' (e.g., from interaction entity 'A' or from any other interaction entity).

In other embodiments of the invention, the supplemental resources may be provided as an integrated notification in a user's contextual data. As will be described in greater detail herein, user contextual data may be any data obtained related to the user (e.g., stored on the user computer systems 20, stored on the resource entity system 10, interaction entity systems 30, and/or third party entity systems 40, and the like) and the user's activity. In such embodiments, the system may be configured to receive user contextual data and integrate a notification of the availability of supplemental resources related to the contextual data within the contextual data itself. For example, in some embodiments, the system may receive contextual data such as a photograph or image stored on the user computer system 20. The photograph received from the user computer system may include a retail store in the background of the image. The system may extract contextual information from the photograph (e.g., that the user has recently visited the retail store) and determine that the user has recently been in the vicinity of the retail store. The system may further determine—according to the methods described herein—that supplemental available resources related to that retail store are available to the user. Accordingly, the system may place a notification (e.g., a pin, marker, or the like) over the retail store in the photograph. Thus, when the user views the photograph (e.g., on the user computer system, on a social media platform, or the like), the user will see an integrated notification that supplemental resources are available at the retail store contained within the photograph.

In other embodiments of the invention, the supplemental resources may be provided as an alert within the resource entity application 17 (e.g., online interaction account), which when selected may provide a targeted integrated interface with a plurality of supplemental resources for which the user 4 qualifies. In some embodiments, the notification for the supplemental resources is transmitted to the user's email account. In other embodiments, the notification for the supplemental resources is transmitted, via text message or the like, to the user's mobile device.

In some embodiments, the presented supplemental resources are related to at least one of an interaction previously entered by the user (e.g., a previous transaction associated with the user's financial institution account), an interaction from an interaction entity from which the user previously entered into an interaction, an alternative to the interaction previously entered into by the user, or an alternative to the interaction from the interaction entity from which the user previously entered into an interaction. The alternative to the interaction may be determined based on interaction histories associated with a plurality of resource pools associated with multiple users.

In some embodiments, the presented notification for the supplemental resources relates to a new product related to a previous product interaction made by the user. For example, if the user previously purchased a stove, the supplemental resources may be related to a dishwasher or a stove maintenance service.

In some embodiments, a notification of supplemental resources sent to or presented on a resource pool associated with a first member of a family may be used by a second member of the family. In some embodiments, the second member of the family may use the supplemental resources even if the second member is not associated with the resource pool associated with the first member. For example, the supplemental resources associated with a particular interaction entity may be transmitted to (or linked to) a resource pool associated with a first family member. When the second member of the family enters an interaction that qualifies for the supplemental resources using the second member's resource pool (e.g., any qualifying payment method), the second member receives the allocation of the supplemental resources after entering into the interaction. The resource entity may have access to information that indicates that the second member is a family member of the first member even if the second member is not listed as being associated with the resource pool associated with the first member.

Additionally, in some embodiments, as part of the previously described supplemental resources reconciliation process at the time of settlement of the supplemental resources, the system determines whether the resource pool information substantially matches the supplemental resources information. If the resource pool information has changed since the interaction such that the resource pool information no longer substantially matches the supplemental resources information, the supplemental resources may be deemed to be invalid and the resource entity does not provide allocation of the supplemental resources to the user's resource pool. However, in other embodiments, even if the resource pool information has changed since the interaction, the offer remains valid and the financial institution provides a rebate to the user's financial institution account.

FIG. 3 illustrates an exemplary process flow for providing supplemental resources to a user based on contextual data obtained on the user. As previously noted, contextual data as used herein is any data related to a user that provides context on the user's activity, interests, locations, purchases, and the like. Examples of contextual data may include photographs, e-mail communications, text messages, social media interactions, website browsing history, calendar appointments, GPS coordinates, purchase histories, and the like. The present invention seeks to make use of such contextual data in order to determine relevant supplemental resources to provide to the user as described above.

At block 310, the system receives user information for a user. As noted, user information may comprise resource pool information associated with the user's resource pool. In some embodiments, resource pool information, as used herein, refers to information associated with the user's resource pool managed by one or more resource entities. In some embodiments, the resource pool information comprises an interaction history (e.g., a transaction history, or the like) associated with the user's resource pool. The interaction history includes the types of interactions, frequency of interactions, resources used for the interactions, entities involved in the interactions, resource balance history, or the like. As used herein, an interaction, may be a transaction such as a purchase, a deposit, a withdrawal, a credit, a debit, or the like associated with a resource pool.

In some embodiments, the user information comprises other information as well. For example, in some embodiments, the user information may comprise additional information associated with the user, such as social network information associated with the user's social network account or other non-account related information associated with the user.

At block 320, the system accesses contextual data. The system may access contextual data in several ways. In some embodiments, the user may consent to allow resource entity systems 10 or third party entity systems 40 to access contextual data on the user computer systems 20 (e.g., photographs, emails, live streaming video, calendar, contacts, and the like) or other systems for which the user has access. For example, the user may allow the resource entity system 10 to access the user's images on the user's mobile device (e.g., when the user logs into the resource entity application, the user may consent to the resource entity application accessing the contextual data on the user's mobile device, or otherwise allowing the access even when the user is not logged into the resource entity application, or the like). In other examples, the user 4 may provide the resource entity systems 10 access to the user's social networking account (e.g., by providing the user's password and login to the resource entity, allowing the resource entity to become a contact of the user, or the like). As such, the resource entity systems 10 may capture contextual data from the user's private or public social networking accounts. In other embodiments, contextual data may be supplied based on an interaction between the user 4 and interaction entity systems 30 (e.g., data collected by internet analytics based on a user's browsing history and cookies, metadata, or the like). Typically, contextual data will be unprocessed (i.e., the data itself will not provide contextual information without additional processing by the system.

Thus, at block 330, the system extracts contextual information from the contextual data. The system may extract contextual information in many ways. In some embodiments, the system will employ optical character recognition (OCR), facial recognition software, or other image software to extract contextual information from the contextual data. For example, the contextual data may be a photograph that comprises one or more storefronts. Using OCR, the system can identify the names of the storefronts. Thus, the system will be able to determine that the user 4 was near a Store A, Store B, and so on. Using this context, the system will be able to determine if supplemental resources are available to the user 4 at Store A, Store B, or other stores identified through OCR. Similarly, the contextual data may also be a photograph comprising concert tickets, movie tickets, people, or the like. Using OCR, facial recognition software, or the other software, the system can determine that the user has purchased tickets to a concert on a certain date for Band A and/or is with a particular contact (e.g., social networking contact by comparing the captured contextual data with tags or other information from images in the user's social networking accounts). The system may then be able to determine if supplemental resources are available to the user 4 or contacts of the user related to the upcoming concert, or for other similar events and/or products.

In other embodiments, the contextual data may be an email associated with the user 4, a calendar event associated with the user 4, or an interaction posted to a social media account associated with the user 4. In such an embodiment, the system may extract contextual information from the email, calendar event, or social media interaction using context-specific grammars and language parsing. As used herein, a context-specific grammar is a set of rules that describe how to form strings in a language (e.g., English) according to the language's syntax. Context-specific grammars allow a system to "understand" written language. For example, the user 4 may have an event stored in a calendar connected to their mobile device for their spouse's anniversary. Using context-specific grammars, the system can determine that the user 4 has an upcoming wedding anniversary. Accordingly, the system may determine that there are supplemental resources available to the user 4 related to the user's wedding anniversary (e.g., discounts at a florist, jewelry store, restaurant, or the like.

Once the system has extracted contextual information from the contextual data—using OCR, facial recognition, context-specific grammars, or the like—the system at block 340 identifies supplemental resources to present to the user based on the user information and the contextual information. Some examples of this were discussed above (e.g., supplemental resources to a florist based on determining the user 4 has an upcoming anniversary, supplemental resources to Store A based on determining the user has a photograph outside of Storefront A, and the like). The resource entity systems 10 may comprise a catalog of available supplemental resources to provide to the user 4. In other embodiments, the resource entity systems 10 may communicate with third party entity systems 40 and interaction entity systems 30 to provide supplemental resources to the user 4. For example, the resource entity system may maintain categories of contextual information on one or more users 4 and provide such information to the interaction entity systems 30 and third party entity systems 40. The contextual information may be one or more users with an upcoming vacation and the interaction entity systems 30 may be associated with a hotel chain. The resource entity may present the one or more users with an upcoming vacation to the interaction entity system 30 associated with a hotel chain to allow the hotel chain to offer supplemental resources to the one or more users 4.

At block 350, the system transmits a notification of the supplemental resources to present to the user based on the user information and the contextual information. In some embodiments, the system may transmit a notification to the user computer systems 20. In other embodiments, the system may transmit a notification to by e-mail, text message, push notification, and the like to an account associated with the user 4.

In some embodiments, the system may transmit notification by placing an indicator within the contextual data. As discussed in more detail with respect to FIG. 4, such an embodiment may comprise contextual data in the form of a photograph or an image, and placing an indicator in the image may comprise editing the image to include a marker, a pin, or the like to indicate that supplemental resources are available related to an identified object in the photograph or image.

In yet other embodiments, transmitting a notification of the supplemental resources to present to the user based on the user information and the contextual information may comprise opening an augmented reality application on the user computer system 20. Such embodiments may be useful when geographic location information (e.g., GPS coordinates) from a user computer system 20 indicates that the user 4 is proximate to an offer for supplemental resources. For example, the GPS on a user's 4 mobile device may indicate that the user is in a shopping mall where several supplemental resources are available to the user 4. The system may send notification to the user 4 to open an augmented reality application on their mobile device. The augmented reality application captures image data from an image capture device operatively coupled to the user's mobile device. The image capture device may be a camera connected to the user's mobile phone. Alternatively, the image capture device may be cameras located proximate to the user 4 that connect to the user device over a network to provide images. The image data will then display on the user mobile device. While the augmented reality application displays the captured image data on the user mobile device, it can also identify objects in the image data using techniques similar to those discussed above (e.g., OCR, context-specific grammars and parsing, and the like). If the identified objects are associated with supplemental resources available to the user, the augmented reality application can place indicators in the captured image data displayed on the user's mobile device to indicate to the user 4 that supplemental resources are available.

At block 360, the system receives a user selection to accept the supplemental resources, wherein the user selection is received from the user computer systems 20. In some embodiments of the invention, a user 4 will accept the supplemental resources by choosing an "Accept" option that accompanies the notification of supplemental resources to the user. However, it will be understood that the user may accept the supplemental resources in any acceptable manner, including but not limited to, clicking a link to visit a resource entity website, responding "Yes" or "Accept" to an email, sms message, or the like, choosing to automatically accept any available supplemental resources, or any other similar means of acceptance.

Finally, at block 370, the system stores the supplemental resources as being associated with the user or a resource pool of the user. Storing the supplemental resources as being associated with the user typically comprises storing a pointer reference, a flag, or the like along with user information and/or the user resource pool stored on the resource entity systems 10 that indicate the user has accepted supplemental resources. Thus, when the user 4 seeks to use the supplemental resources, the resource entity systems 10 can apply the supplemental resources to the user's 4 resource pool when processing the transaction.

FIG. 4 depicts an embodiment of the invention wherein notification of supplemental resources are displayed to the user as an integrated notification within a photograph, image, or augmented reality environment 400. Integrating the notification within a photograph, image, or augmented reality environment 400 requires the system to receive a photograph, image, or camera feed (e.g., for the augmented reality environment) and edit the received photograph, image, or camera feed to include notifications over particular embodiments, before transmitting the edited photograph, image, or camera feed over the network 2 to be viewed on the user computer system 20. According to embodiments of the invention, users may be entirely unaware of the communications between the user computer systems 20 and the entity computer systems 30 to receive, edit, and transmit the image back to the user computer systems 20. As such, the user is simply presented with an offer for supplemental resources integrated into a photograph, image, or augmented reality environment 400 on their user computer systems.

As shown in FIG. 4, an environment 400 may comprise an image (either a still photograph or a live-feed augmented reality environment) that can be displayed on the display of user computer systems 20. As described above, the system is able to use contextual data (e.g., OCR, context-specific grammars, and the like) to identify objects) in the environment 400 and determine whether supplemental resources are available to the user based on the identified objects. For example, several buildings are depicted in the environment 400 depicted in the embodiment portrayed by FIG. 4. In such an embodiment, the system may be able to identify building 420 (e.g., using OCR to read signage outside of Building X, using geotags within a stored image to determine the location of the photo as Building X, or the like). Using information stored on the entity computer systems 10 or third party entity systems 40, the system can determine that there is Store A housed in building 420. Further, the system may also determine that the user 4 has supplemental resources available to them at Store A.

According to embodiments of the invention as depicted by FIG. 4, the system may then transmit notification of the available supplemental resources by placing a marker 410 within the image or augmented reality environment over building 420 to indicate the availability of supplemental resources. In some embodiments, the marker 410 may be a flag, icon, or the like that indicates supplemental resources are available related to the identified object (e.g., a store housed within a building). In some embodiments, the user may tap on the marker 410 to view the offer of supplemental resources. In such embodiments, a text window may appear that details the supplemental resources available the user. The text window may contain text that indicates the availability of supplemental resources available to the user 4 (e.g., "Supplemental Resources Available. Do you accept?"). Additionally, the text window may provide the user with the option to accept the supplemental resources by selecting a "Yes" to accept the supplemental resources or a "No" to decline.

Referring generally to the embodiments of the invention, supplement resources may be offers for discounts, rebates, and/or coupons (e.g., reverse couponing) that are applied to the user's resource pool retroactively after the interaction has been made. As such, the system enables transmission of individualized or personalized offers to users. For example, an offer associated with a merchant may be a 10% discount on a purchase made from that merchant. As an example, the activated offer may be a rebate of $5 on a purchase of $20 or more from a department store. The user may decide to use the offer by visiting the department store and making a purchase of $20. In some embodiments, at the point of sale, the user pays $20 for the user's purchase using an eligible payment method determined by the financial institution or the merchant (e.g., payment card, mobile device payment, check, or the like). When the transaction is processed by the financial institution at a predetermined settlement time in the future (e.g., as part of a periodic batch processing operation to generate monthly account statements), the financial institution provides a rebate of $5 to the user's financial institution account. Therefore, the department store, at the point of sale, may have no knowledge that the user will receive a rebate at some point in the future. In some embodiments, even the user may not be aware of the rebate at the point of sale (e.g., if the offer was automatically activated). In other embodiments, the point of sale terminal may provide an indication to at least one of the department store or the user that the user will receive a rebate at some point in the future.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein. In some embodiments, memory may include volatile memory, such as volatile random access memory (RAM) having a cache area for the temporary storage of information. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory or the like) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for context-based resource prompting, the system comprising:
   one or more processor components;
   one or more memory components operatively coupled to the one or more processor components;
   computer programmable instructions stored on the one or more memory components and configured to cause the one or more processor components to:
   identify user information for a user;
   receive a location of the user, wherein the location is received from a location determination device on one or more user computer systems;
   access contextual data, wherein accessing the contextual data comprises accessing unprocessed data regarding the user stored on one or more entity computer systems, wherein the contextual data comprises an image;
identify in the image at least one object;
extract contextual information from the accessed contextual data;
determine, based on the location of the user, that the user is proximate to a previous interaction for which the user previously accepted supplemental resources;
identify new supplemental resources to present to the user based on the user information, the location of the user, the identified at least one object in the image, and the contextual information, wherein identifying new supplemental resources comprises communicating with third-party systems to provide new supplemental resources to the user;
transmit a notification of the new supplemental resources to the user, wherein the notification includes an indication that the user is proximate to the previous interaction and a request to the user to accept or deny the new supplemental resources, wherein the notification is integrated in the image and transmitting the notification includes transmitting the image integrated with the new supplemental resource to the user computer system, wherein the notification is an indicator in the image, and wherein the user selects the indicator to view the notification of the new supplemental resources;
receive a user selection to accept the new supplemental resources, wherein the user selection is received from the user computer systems; and
store the new supplemental resources as being associated with the user or a resource pool of the user.

2. The system of claim 1, wherein the computer programmable instructions stored on the one or more memory components are further configured to cause the one or more processor components to:
create a link with the user computer system;
open an augmented reality application on the user computer system, wherein the augmented reality application is configured to:
capture image data from an image capture device operatively coupled to the user computer systems;
identify a plurality of objects in the image data;
determine an identity of at least one object from the image data;
wherein identifying new supplemental resources is based on the at least one object from the image data;
indicate on a display of the user computer systems the notification of the new supplemental resources along with the at least one object.

3. The system of claim 1, wherein identifying the at least one object comprises employing optical character recognition (OCR) to identify at least one object in the image.

4. The system of claim 1, wherein the contextual data is an event.

5. The system of claim 4, wherein the event is determined from a user calendar, and wherein the system is further configured to:
access the user calendar, wherein the user calendar is accessed through the user computer system or an entity system.

6. The system of claim 4, wherein the event is determined from a social networking account of the user, and wherein the system is further configured to:
receive permission from the user to access the social networking account of the user; and
identify the event for which the user is interested, wherein the user is tagged for the event or the user has otherwise indicated that the user is going to the event.

7. The system of claim 1, wherein the computer programmable instructions stored on the one or more memory components are further configured to cause the one or more processor components to:
receive a request from an interaction entity to process an interaction between the interaction entity and the user, wherein the interaction is a transaction for a product;
determine that the transaction with the interaction entity meets requirements of the supplemental resources that the user previously accepted;
allocate resources in a resource pool of the user for the interaction for the product with the interaction entity;
apply the supplemental resources to the resource pool of the user after the resources from the resource pool have already been allocated; and
wherein the interaction entity is unaware that the user accepted the supplemental resources and that the supplemental resources have been applied to the user's resource pool at a time the supplemental resources are applied.

8. A computer program product for context-based resource prompting, the computer program product comprising a non-transitory computer-readable storage medium having computer-executable instructions for:
identifying user information for a user;
receiving a location of the user, wherein the location is received from a location determination device on one or more user computer systems;
accessing contextual data, wherein accessing the contextual data comprises accessing unprocessed data regarding the user stored on one or more entity computer systems, wherein the contextual data comprises an image;
identifying in the image at least one object;
extracting contextual information from the accessed contextual data;
determining, based on the location of the user, that the user is proximate to a previous interaction for which the user previously accepted supplemental resources;
identifying new supplemental resources to present to the user based on the user information, the location of the user, the identified at least one object in the image, and the contextual information, wherein identifying new supplemental resources comprises communicating with third-party systems to provide new supplemental resources to the user;
transmitting a notification of the new supplemental resources to the user, wherein the notification includes an indication that the user is proximate to the previous interaction and a request to the user to accept or deny the new supplemental resources, wherein the notification is integrated in the image and transmitting the notification includes transmitting the image integrated with the new supplemental resource to the user computer system, wherein the notification is an indicator in the image, and wherein the user selects the indicator to view the notification of the new supplemental resources;
receiving a user selection to accept the new supplemental resources, wherein the user selection is received from the user computer systems; and
storing the new supplemental resources as being associated with the user or a resource pool of the user.

9. The computer program product of claim 8, wherein the non-transitory computer-readable storage medium has computer-executable instructions for:
creating a link with the user computer system;
opening an augmented reality application on the user computer system, wherein the augmented reality application is configured to:
capture image data from an image capture device operatively coupled to the user computer system;
identify a plurality of objects in the image data;
determine an identity of at least one object from the image data;
wherein identifying new supplemental resources to present to the user is based on the at least one object identified from the image data; and
indicating on a display of the user computer systems the notification of the new supplemental resources along with the at least one object.

10. The computer program product of claim 8, wherein identifying the at least one object comprises employing optical character recognition (OCR) to identify at least one object in the image.

11. The computer program product of claim 8, wherein the contextual data is an event.

12. The computer program product of claim 11, wherein the event is determined from a user calendar, and wherein the wherein the non-transitory computer-readable storage medium has computer-executable instructions for accessing the user calendar, wherein the user calendar is accessed through the user computer system or an entity system.

13. The computer program product of claim 8, wherein the non-transitory computer-readable storage medium has computer computer-readable executable instructions for:
receiving a request from an interaction entity to process an interaction between the interaction entity and the user, wherein the interaction is a transaction for a product;
determining that the transaction for the product or with the interaction entity meets requirements associated with the new supplemental resources to the resource pool of the user after the resources from the resource pool have already been allocated;
applying the new supplemental resources to the resource pool of the user after the resources from the resource pool have already been allocated; and
wherein the interaction entity is unaware that the user accepted the new supplemental resources and that the new supplemental resources have been applied to the user's resource pool at a time the new supplemental resources are applied.

14. A method for context-based resource prompting, the method comprising:
identifying user information for a user;
receiving, by a processor, a location of the user, wherein the location is received from a location determination device on one or more user computer systems;
accessing, by a processor, contextual data, wherein accessing the contextual data comprises accessing unprocessed data regarding the user stored on one or more entity computer systems, wherein the contextual data comprises an image;
identifying, by a processor, in the image at least one object;
extracting, by a processor, contextual information from the accessed contextual data;
determining, by a processor, based on the location of the user, that the user is proximate to a previous interaction for which the user previously accepted supplemental resources;
identifying, by a processor, new supplemental resources to present to the user based on the user information, the location of the user, the identified at least one object in the image, and the contextual information, wherein identifying new supplemental resources comprises communicating with third-party systems to provide new supplemental resources to the user;
transmitting, by a processor, a notification of the new supplemental resources to the user, wherein the notification includes an indication that the user is proximate to the previous interaction and a request to the user to accept or deny the new supplemental resources, wherein the notification is integrated in the image and transmitting the notification includes transmitting the image integrated with the new supplemental resource to the user computer system, wherein the notification is an indicator in the image, and wherein the user selects the indicator to view the notification of the new supplemental resources;
receiving, by a processor, a user selection to accept the new supplemental resources, wherein the user selection is received from the user computer systems; and
storing, by a processor, the new supplemental resources as being associated with the user or a resource pool of the user.

15. The method of claim 14, the method further comprising:
creating, by a processor, a link with the user computer system;
opening, by a processor, an augmented reality application on the user computer system, wherein the augmented reality application is configured to:
capture image data from an image capture device operatively coupled to the user computer system;
identify a plurality of objects in the image data;
determine an identity of at least one object from the image data;
wherein identifying new supplemental resources to present to the user is based on the at least one object identified from the image data; and
indicating, by a processor, on a display of the user computer systems the notification of the new supplemental resources along with the at least one object.

16. The method of claim 14, wherein identifying the at least one object comprises employing optical character recognition (OCR) to identify at least one object in the image.

17. The method of claim 14, wherein the contextual data is an event.

18. The method of claim 17, wherein the event is determined from a user calendar, and wherein the method further comprises accessing, by a processor, the user calendar, wherein the user calendar is accessed through the user computer system or an entity system.

19. The method of claim 14, wherein the method further comprises:
receiving, by a processor, a request from an interaction entity to process an interaction between the interaction entity and the user, wherein the interaction is a transaction for a product;
determining, by a processor, that the transaction for the product or with the interaction entity meets the requirements associated with of the new supplemental resources to the resource pool of the user after the resources from the resource pool have already been allocated;

applying, by a processor, the new supplemental resources to the resource pool of the user after the resources from the resource pool have already been allocated; and wherein the interaction entity is unaware that the user accepted the new supplemental resources and that the new supplemental resources have been applied to the user's resource pool at the a time the new supplemental resources are applied.

\* \* \* \* \*